US011205438B1

(12) United States Patent
 Chhetri

(10) Patent No.: US 11,205,438 B1
(45) Date of Patent: Dec. 21, 2021

(54) AUTONOMOUSLY MOTILE DEVICE WITH ACOUSTIC ECHO CANCELLATION

(71) Applicant: Amazon Technologies, Inc., Seattle, WA (US)

(72) Inventor: Amit Chhetri, Sunnyvale, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/538,981

(22) Filed: Aug. 13, 2019

(51) Int. Cl.
| | |
|---|---|
| *G10L 21/0232* | (2013.01) |
| *H04R 1/40* | (2006.01) |
| *H04R 3/00* | (2006.01) |
| *G10L 25/84* | (2013.01) |
| *G10L 15/22* | (2006.01) |
| *G10L 15/20* | (2006.01) |
| *H04R 3/04* | (2006.01) |
| *G10L 21/0208* | (2013.01) |

(52) U.S. Cl.
 CPC .......... *G10L 21/0232* (2013.01); *G10L 15/20* (2013.01); *G10L 15/22* (2013.01); *G10L 25/84* (2013.01); *H04R 1/406* (2013.01); *H04R 3/005* (2013.01); *H04R 3/04* (2013.01); *G10L 2021/02082* (2013.01)

(58) Field of Classification Search
 CPC ..... G10L 21/0232; G10L 15/20; G10L 15/22; G10L 25/84; G10L 2021/02082; H04R 1/406; H04R 3/005; H04R 3/04
 See application file for complete search history.

(56) References Cited

U.S. PATENT DOCUMENTS

| | | | | |
|---|---|---|---|---|
| 2013/0129102 | A1* | 5/2013 | Li | H04M 9/082 |
| | | | | 381/71.1 |
| 2019/0212441 | A1* | 7/2019 | Casner | H04S 7/30 |
| 2019/0308327 | A1* | 10/2019 | Wolford | B25J 9/162 |

\* cited by examiner

*Primary Examiner* — Andrew L Sniezek
(74) *Attorney, Agent, or Firm* — Pierce Atwood LLP

(57) ABSTRACT

A device capable of motion includes an acoustic echo canceller for cancelling a reference signal from received audio data. The device updates an adaptive filter as the device moves to reflect the changing audio channel between a loudspeaker and a microphone of the device. A step size for changing coefficients of the filter is determined based on its velocity. A number of iterations for updating the filter using a frame of audio data is also determined based on the velocity.

20 Claims, 24 Drawing Sheets

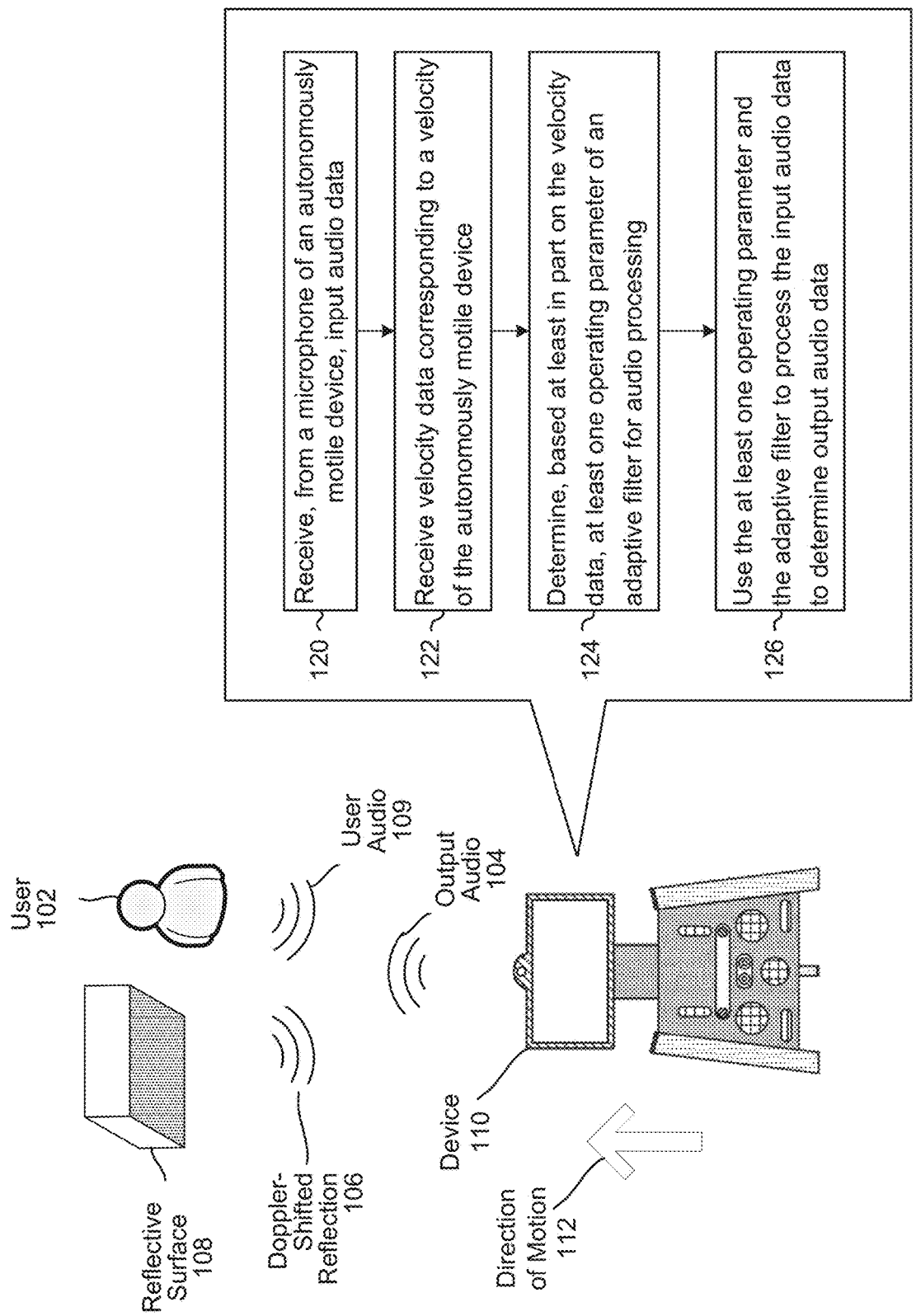

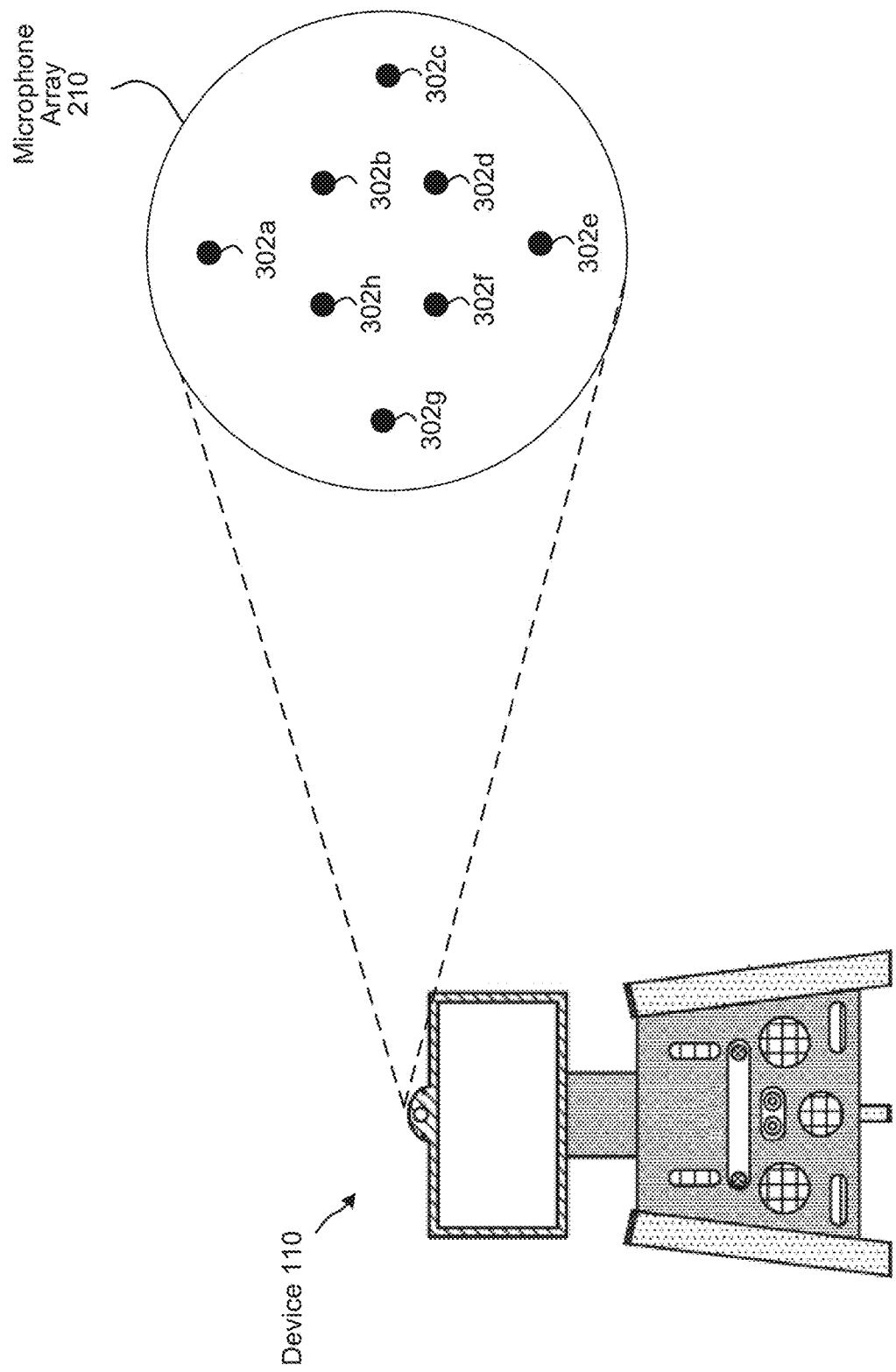

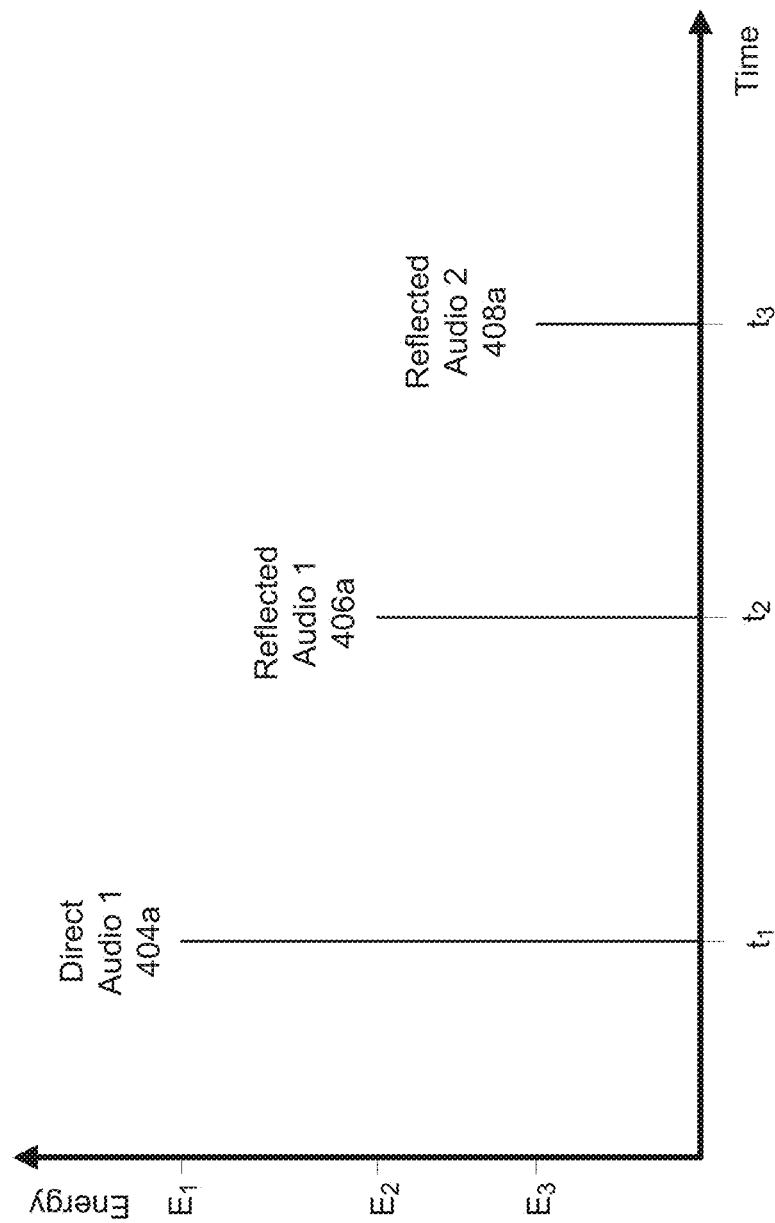

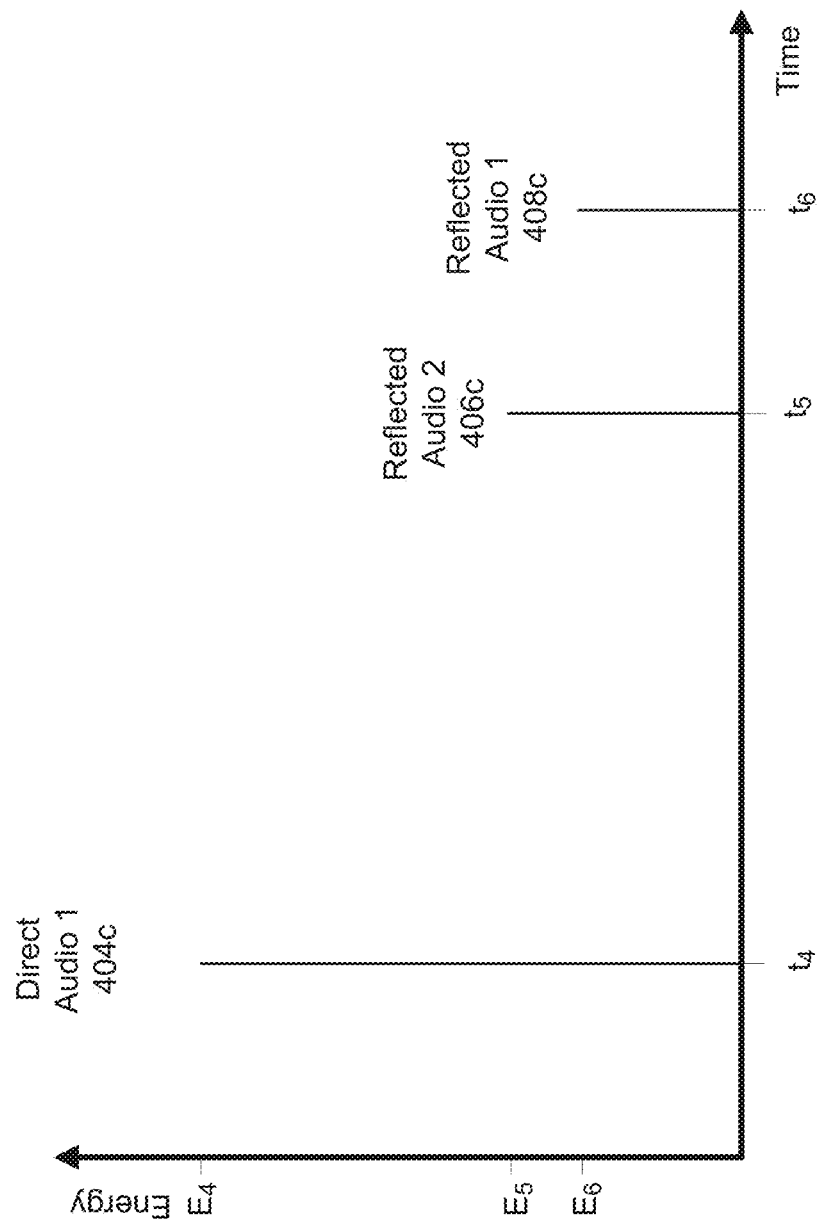

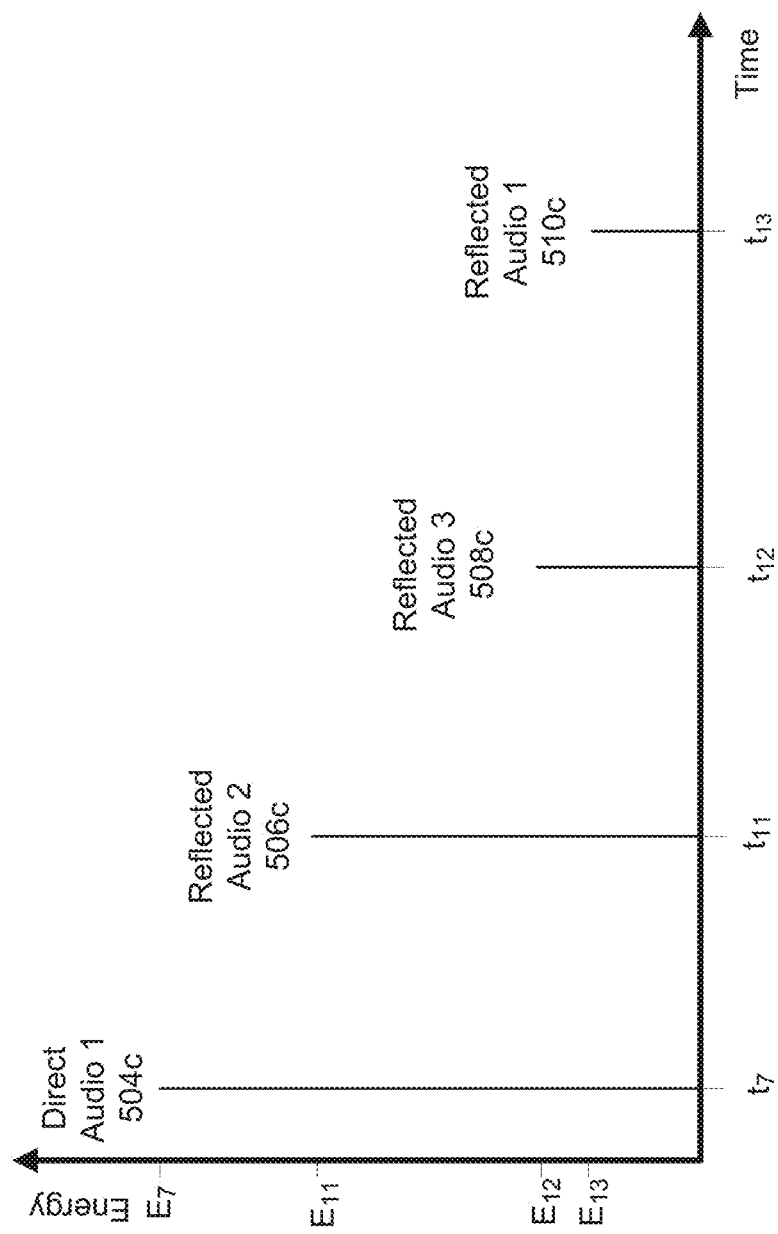

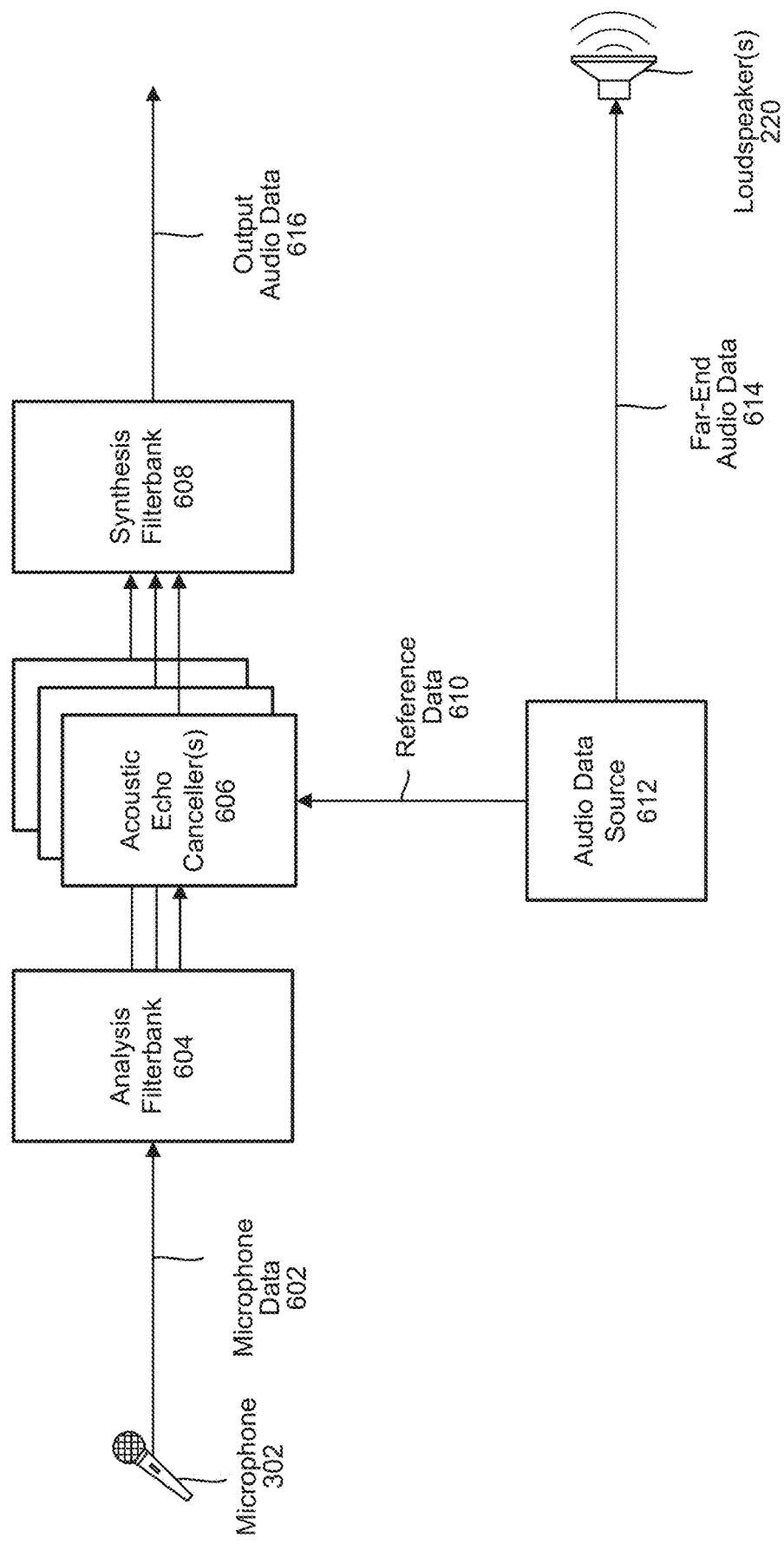

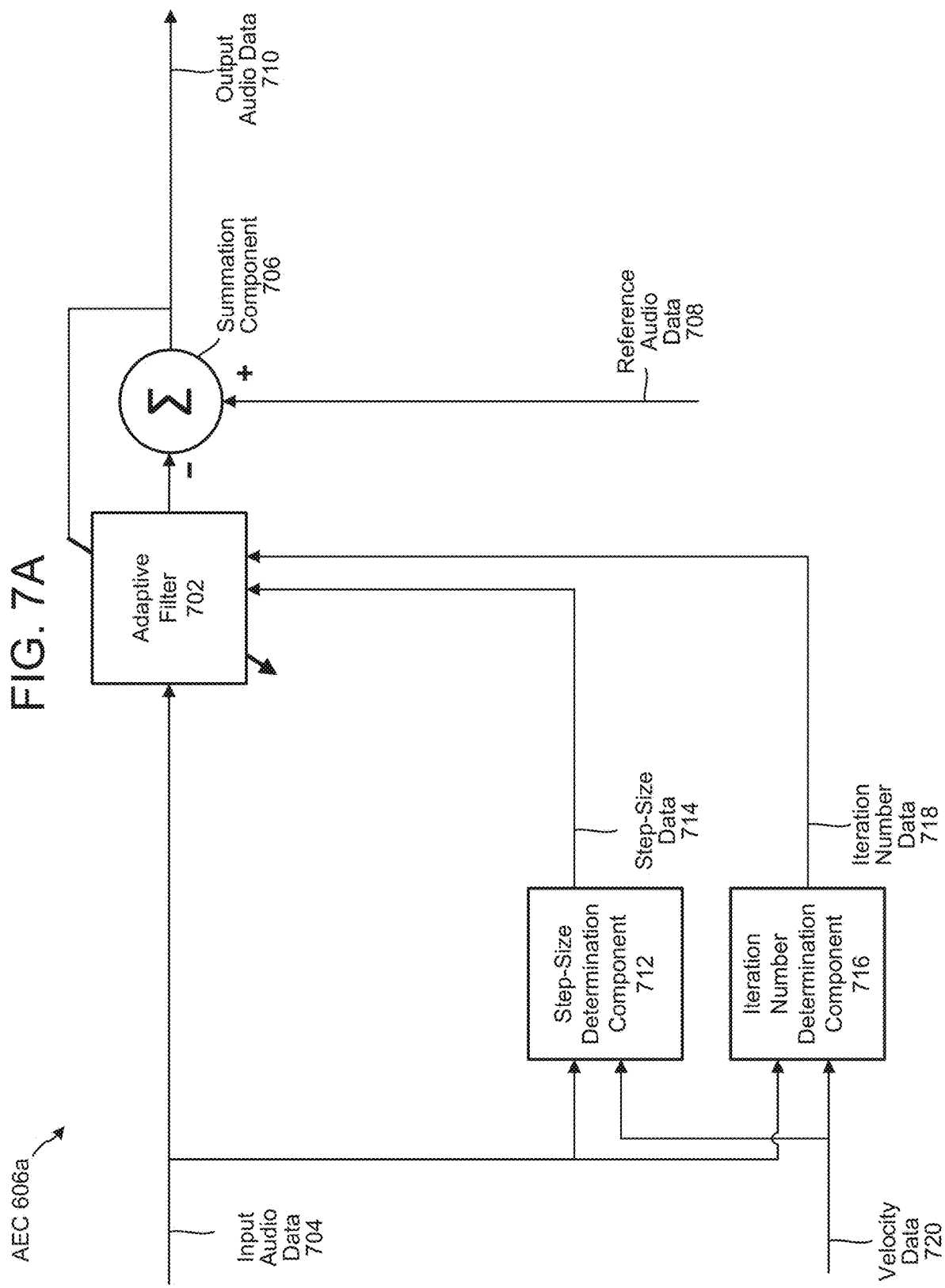

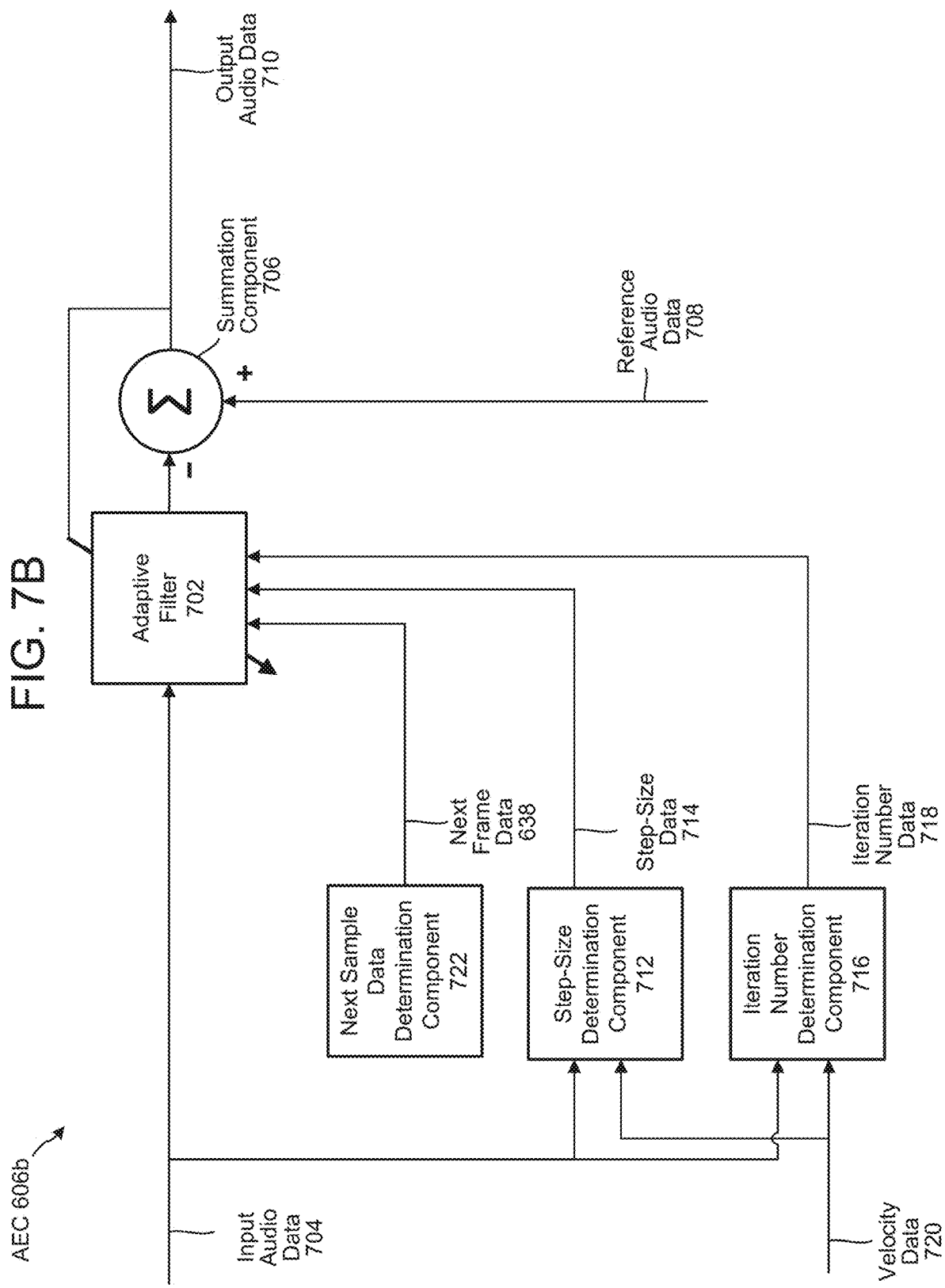

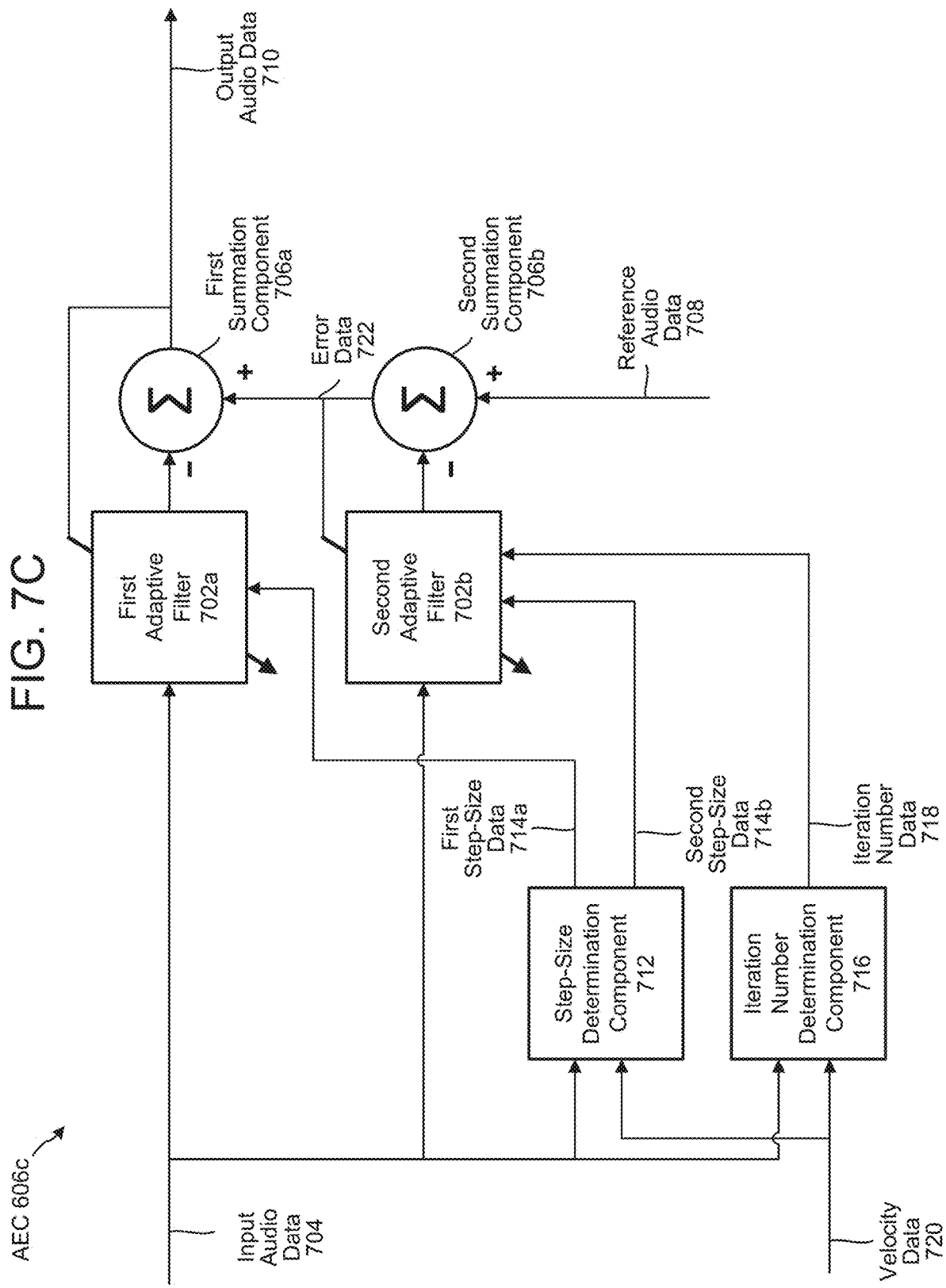

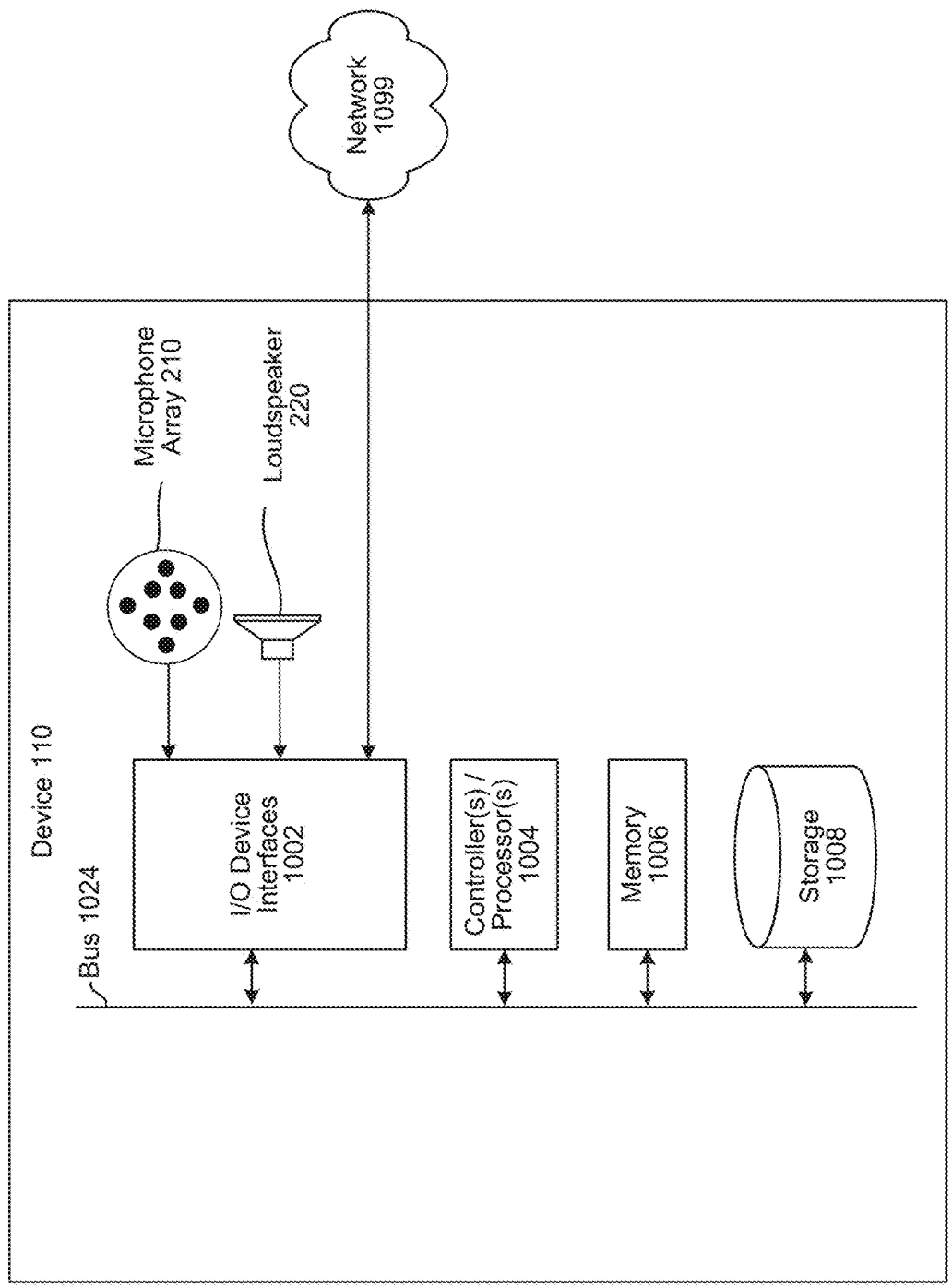

AUTONOMOUSLY MOTILE DEVICE WITH ACOUSTIC ECHO CANCELLATION

BACKGROUND

In audio systems, acoustic echo cancellation refers to techniques that use an adaptive filter to subtract reference audio data from near-end audio data. The adaptive filter models an audio channel between a loudspeaker used to output far-end audio and at least one microphone that captures near-end audio data. The near-end audio data may include a representation of the far-end audio as modified by the channel, which may also include Doppler-shifted audio data. Acoustic echo cancellation may be used in various tasks, including isolating voice commands to be executed by a speech-processing system.

BRIEF DESCRIPTION OF DRAWINGS

For a more complete understanding of the present disclosure, reference is now made to the following description taken in conjunction with the accompanying drawings.

FIG. 1 illustrates a system and method for acoustic echo cancellation using a device capable of autonomous motion according to embodiments of the present disclosure.

FIG. 3 illustrates a microphone array according to embodiments of the present disclosure.

FIGS. 4A-4D illustrate an autonomously motile device receiving near-end audio from a loudspeaker according to embodiments of the present disclosure.

FIGS. 5A-5D illustrate an autonomously motile device receiving near-end audio from its own loudspeaker according to embodiments of the present disclosure.

FIGS. 6A and 6B illustrates systems using acoustic echo cancellation according to embodiments of the present disclosure.

FIGS. 7A-7C illustrate acoustic echo cancellation systems according to embodiments of the present disclosure.

FIG. 10 illustrates a system for acoustic echo cancellation according to embodiments of the present disclosure.

DETAILED DESCRIPTION

Figure 2A:
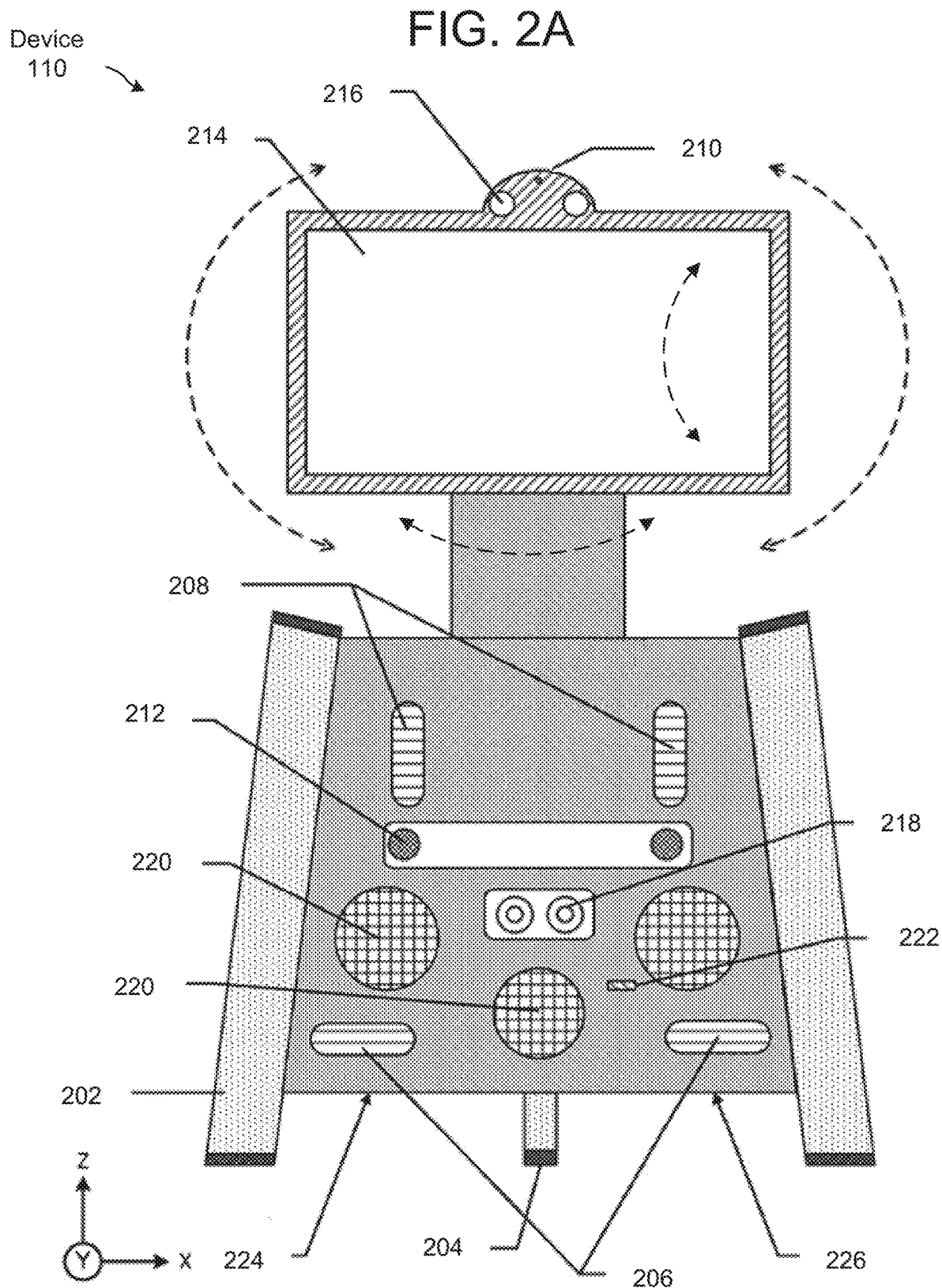
FIGS. 2A, 2B, and 2C illustrate views of a device capable of autonomous motion according to embodiments of the present disclosure.

An autonomously motile device—e.g., a robot—may include a speech-recognition system. Speech-recognition systems have progressed to a point at which humans may interact with the devices using speech. Such systems employ techniques to identify the words spoken by a human user based on the various qualities of a received audio input. Speech recognition combined with natural-language understanding processing techniques enable speech-based user control of a computing device to perform tasks based on the user's spoken commands. The combination of speech recognition and natural-language understanding processing techniques is commonly referred to as speech processing. Speech processing may also convert a user's speech into text data which may then be provided to various text-based software applications. Speech processing may be used by autonomously motile devices, computers, hand-held devices, telephone computer systems, smart loudspeakers, kiosks, and a wide variety of other devices to improve human-computer interactions. As described herein, an autonomously motile device may include a device that is capable of moving in an environment with or without a direct user command to do so. For example, an autonomously motile device may include wheels mounted on a housing that are driven by a motor; the device may further include sensors for sensing the environment and input/output devices for communicating with a user. The device may use its wheels, motor, sensors, and input/output devices to, for example, follow a user of the device throughout the environment.

Certain devices capable of capturing speech for speech processing may operate using a single microphone or microphone array comprising multiple microphones in which acoustic-echo cancellation techniques operate on the audio captured by the microphone or array. Acoustic-echo cancellation refers to techniques that reduce or eliminate audio output by a separate external loudspeaker disposed in an environment of the autonomously mobile device and/or audio output by a loudspeaker affixed to the autonomously motile device from audio received by a microphone or microphone array of the autonomously motile device. Without acoustic-echo cancellation, sounds output by the loudspeaker(s) would be re-captured by the microphone, and the captured audio data would not just include sounds, such as utterances of a user, local to the device (e.g., "near-end" sounds), but also sounds, such as music or speech, output by the device ("far-end" sounds). As explained in greater detail below, acoustic-echo cancellation subtracts the far-end sounds from received audio data. Because of the Doppler shift described above, however, the far-end sounds output by the device may differ from reflected sounds received by the microphone. This difference may result in less-than-optimal acoustic-echo cancellation.

The autonomously mobile device may also perform beamforming. In audio systems, beamforming refers to techniques that are used to isolate audio from one or more particular directions. Beamforming may be particularly useful when filtering out noise from non-desired directions. Beamforming may be used for various tasks, including isolating voice commands to be executed by a speech-processing system. A fixed beamformer component may isolate audio from particular directions by applying one or more filters, each having different filter coefficients, to exploit variations in the time each microphone in the array receives audio from each direction. An adaptive beamformer may remove noise by identifying a direction in which a noise source lies and removing that noise from desired audio. A beam selection component selects at least one beam from a plurality of beams corresponding to a desired direction, such as a direction toward which a user is disposed.

Embodiments of the present disclosure thus describe performing acoustic echo cancellation to account for and reduce or eliminate errors in acoustic echo cancellation that arise due to motion and Doppler shift. In various embodiments, the autonomously motile device moves in a direction with a velocity. As the autonomously motile device moves, its perspective of its environment changes, thus causing audio output by the loudspeaker to behave differently before it is captured by the microphone. This physical environment disposed between the loudspeaker and microphone—which may include physical features of the autonomously motile device itself, as well as reflective surfaces in the environment—is herein referred to as the "channel" of the autonomously motile device. An adaptive filter may model this channel; the far-end audio data is processed using the adaptive filter to create an estimation of the audio received by the microphone. The output of the adaptive filter is then subtracted from the received audio to determine the near-end audio.

The adaptive filter may update one or more of its coefficients to reflecting the changing channel. The adaptive filter may be, for example, a finite-impulse response (FIR) filter that processes audio data to change a delay and/or phase of frequencies of the audio data in accordance with the coefficients, which may be a set of weights. The adaptive filter may use an algorithm, such as a least-mean-squares (LMS) algorithm or recursive least-mean-squares (RLMS) algorithm that minimizes or lessens an error signal to compute a new set of coefficients. The autonomously motile device may determine, based on a velocity of the autonomously motile device, an operating parameter of the adaptive filter, such as a step size used to update the coefficients and/or a number of iterations of updating the coefficients, as described in greater detail below.

FIG. 1 illustrates a system that includes an autonomously motile device 110, which is described in greater detail below. In various embodiments, the autonomously motile device 110 is capable of autonomous motion using one or motors powering one or more wheels, treads, robotic limbs, or similar actuators. The autonomously motile device 110 may further be capable of three-dimensional motion (e.g., flight) using one or more rotors, wings, jets, electromagnetic field generators, or similar actuators. The motion may be linear motion and/or angular motion. The present disclosure is not limited to particular method of autonomous movement/motion. The device 110 may, for example, follow a user 102 around a room to thereby allow the user 102 easier access to features of the device 110, such as its voice interface. If the device 110 is moving in a first direction of motion 112 while it outputs audio 104—e.g., an utterance of a far-end user, music, or other audio—the output audio 104 may reflect from one or more reflective surfaces 108; the resultant reflected audio 106 may include a Doppler shift. The autonomously motile device 110 may thus receive the Doppler-shifted reflection 106 as well as user audio 109, such as an utterance of the user 102. As described herein, the autonomously motile device 110 may cancel—e.g., reduce or remove—the Doppler-shifted refection 106 from the received audio to isolate the user audio 109.

The device 110 may further include one or more display screens for displaying information to a user 102 and/or receiving touch input from a user. The device 110 may further include a microphone array including one or more microphones and one or more loudspeakers; the microphone array and loudspeakers may be used to receive audio data, such as an utterance, from the user 102. The utterance may be, for example, a command or request. The device 110 may also be used to output audio to the user 102, such as audio related to a command or audio related to a request.

The device 110 may further include one or more sensors; these sensors may include, but are not limited to, an accelerometer, a gyroscope, a magnetic field sensor, an orientation sensor, a weight sensor, a temperature sensor, and/or a location sensor (e.g., a global-positioning system (GPS) sensor or a Wi-Fi round-trip time sensor). The device may further include a computer memory, a computer processor, and one or more network interfaces. The device 110 may be, in some embodiments, a robotic assistant or "robot" that may move about a room or rooms to provide a user with requested information or services. In other embodiments, the device 110 is capable of rotation but not linear motion; the device 110 may be mounted or placed on a surface or floor, for example, and may rotate in place to face a user 102. The disclosure is not, however, limited to only these devices or components, and the device 110 may include additional components without departing from the disclosure.

In various embodiments, with reference to FIG. 1, the autonomously motile device 110 receives (120), from a microphone of the autonomously motile device, input audio data. The autonomously motile device 110 receives (122) velocity data corresponding to a velocity of the autonomously motile device. The autonomously motile device 110 determines (124), based at least in part on the velocity data, at least one operating parameter of an adaptive filter for audio processing. The autonomously motile device 110 uses (126) the at least one operating parameter and the adaptive filter to process the input audio data to determine output audio data.

FIG. 2A illustrates a front view of the autonomously motile device 110 according to various embodiments of the present disclosure. The device 110 includes wheels 202 disposed on left and right sides of a lower structure. The wheels 202 may be canted inwards toward an upper structure. In other embodiments, however, the wheels 202 may be mounted vertically. A caster 204 (i.e., a smaller wheel) may disposed along a midline of the device 110. The front section of the device 110 may include a variety of external sensors. A first set of optical sensors 206 may be disposed along the lower portion of the front, and a second set of optical sensors 208 may be disposed along an upper portion of the front. A microphone array 210 may be disposed on a top surface of the device 110; the microphone array 210 may, however, be disposed on any surface of the device 110.

One or more cameras 212 may be mounted to the front of the device 110; two cameras 212 may be used to provide for stereo vision. The distance between two cameras 212 may be, for example, 5-15 centimeters; in some embodiments, the distance is 10 centimeters. In some embodiments, the cameras 212 may exhibit a relatively wide horizontal field-of-view (HFOV). For example, the HFOV may be between 90° and 110°. A relatively wide FOV may provide for easier detection of moving objects, such as users or pets, which may be in the path of the device 110. Also, the relatively wide FOV may provide for the device 110 to more easily detect objects when rotating or turning.

Cameras 212 used for navigation may be of different resolution from, or sensitive to different wavelengths than, other cameras 212 used for other purposes, such as video communication. For example, navigation cameras 212 may be sensitive to infrared light allowing the device 110 to operate in darkness or semi-darkness, while a camera 216 mounted above a display 214 may be sensitive to visible light and may be used to generate images suitable for viewing by a person. A navigation camera 212 may have a resolution of at least 300 kilopixels each, while the camera 216 mounted above the display 214 may have a resolution of at least 10 megapixels. In other implementations, navigation may utilize a single camera 212.

The cameras 212 may operate to provide stereo images of the environment, the user, or other objects. For example, an image from the camera 216 disposed above the display 214 may be accessed and used to generate stereo-image data corresponding to a face of a user. This stereo-image data may then be used for facial recognition, user identification, gesture recognition, gaze tracking, and other uses. In some implementations, a single camera 216 may be disposed above the display 214.

The display 214 may be mounted on a movable mount. The movable mount may allow the display to move along one or more degrees of freedom. For example, the display 214 may tilt, pan, change elevation, and/or rotate. In some embodiments, the display 214 may be approximately 8 inches as measured diagonally from one corner to another. An ultrasonic sensor 218 may be mounted on the front of the device 110 and may be used to provide sensor data that is indicative of objects in front of the device 110.

One or more loudspeakers 220 may be mounted on the device 110, and the loudspeakers 220 may have different audio properties. For example, low-range, mid-range, and/or high-range loudspeakers 220 may be mounted on the front of the device 110. The loudspeakers 220 may be used to provide audible output such as alerts, music, human speech such as during a communication session with another user, and so forth.

Other output devices 222, such as one or more lights, may be disposed on an exterior of the device 110. For example, a running light may be arranged on a front of the device 110. The running light may provide light for operation of one or more of the cameras, a visible indicator to the user that the device 110 is in operation, or other such uses.

One or more floor optical motion sensors (FOMS) 224, 226 may be disposed on the underside of the device 110. The FOMS 224, 226 may provide indication indicative of motion of the device 110 relative to the floor or other surface underneath the device 110. In some embodiments, the FOMS 224, 226 comprise a light source, such as light-emitting diode (LED) and/or an array of photodiodes. In some implementations, the FOMS 224, 226 may utilize an optoelectronic sensor, such as an array of photodiodes. Several techniques may be used to determine changes in the data obtained by the photodiodes and translate this into data indicative of a direction of movement, velocity, acceleration, and so forth. In some implementations, the FOMS 224, 226 may provide other information, such as data indicative of a pattern present on the floor, composition of the floor, color of the floor, and so forth. For example, the FOMS 224, 226 may utilize an optoelectronic sensor that may detect different colors or shades of gray, and this data may be used to generate floor characterization data.

Figure 2B:
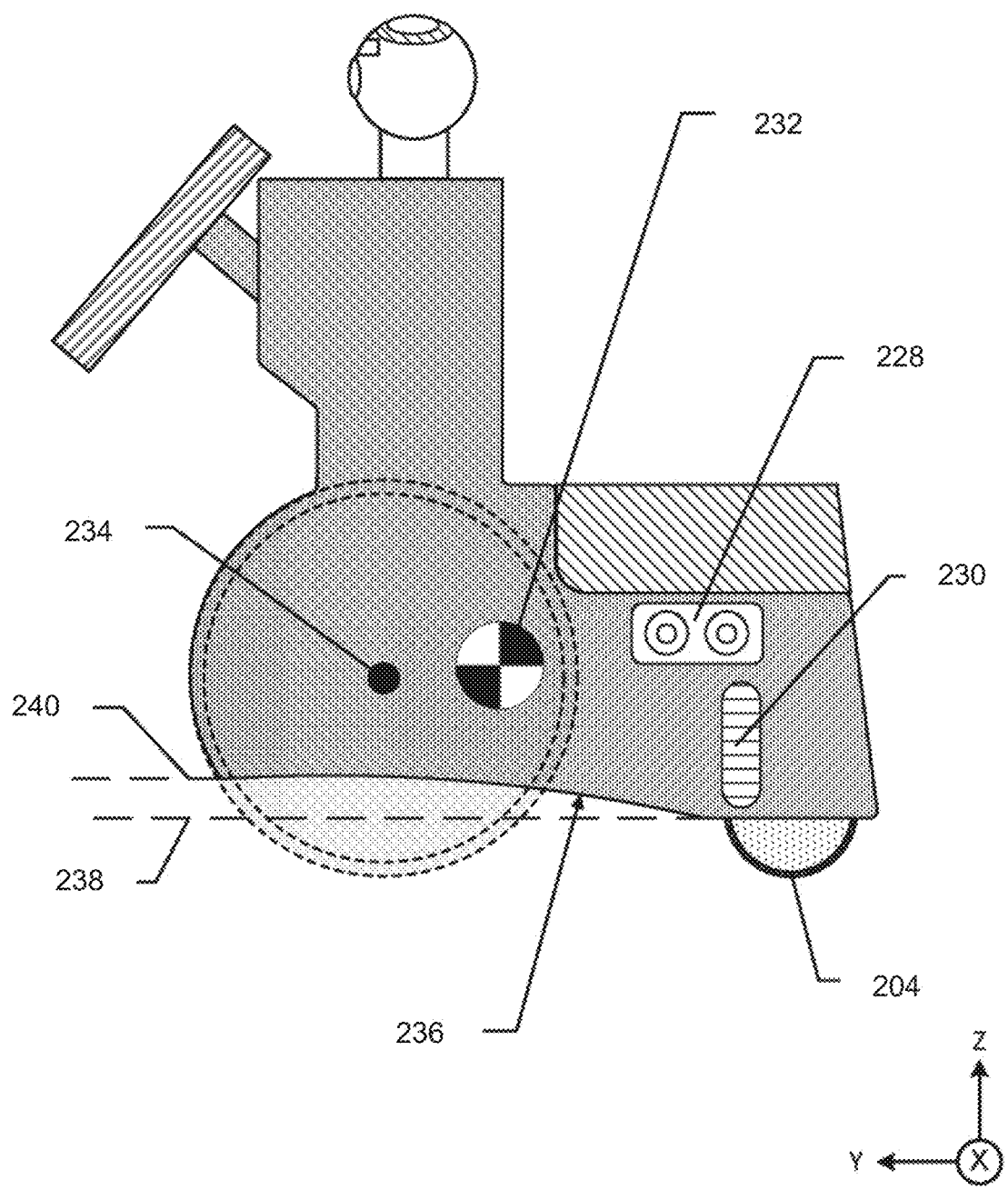

FIG. 2B illustrates a side view of the device 110 according to various embodiments of the present disclosure. In this side view, the left side of the device 110 is illustrated. An ultrasonic sensor 228 and an optical sensor 230 may be disposed on either side of the device 110.

The disposition of components of the device 110 may be arranged such that a center of gravity 232 is located between a wheel axle 234 of the front wheels 202 and the caster 204. Such placement of the center of gravity 232 may result in improved stability of the device 110 and may also facilitate lifting by a carrying handle.

In this illustration, the caster 110 is shown in a trailing configuration, in which the caster 110 is located behind or aft of the wheel axle 234 and the center of gravity 232. In another implementation (not shown) the caster 110 may be in front of the axle of the wheels 202. For example, the caster 204 may be a leading caster 204 positioned forward of the center of gravity 232.

The device 110 may encounter a variety of different floor surfaces and transitions between different floor surfaces during the course of its operation. A contoured underbody 236 may transition from a first height 238 at the front of the device 110 to a second height 240 that is proximate to the caster 204. This curvature may provide a ramp effect such that, if the device 110 encounters an obstacle that is below the first height 238, the contoured underbody 236 helps direct the device 110 over the obstacle without lifting the driving wheels 202 from the floor.

Figure 2C:
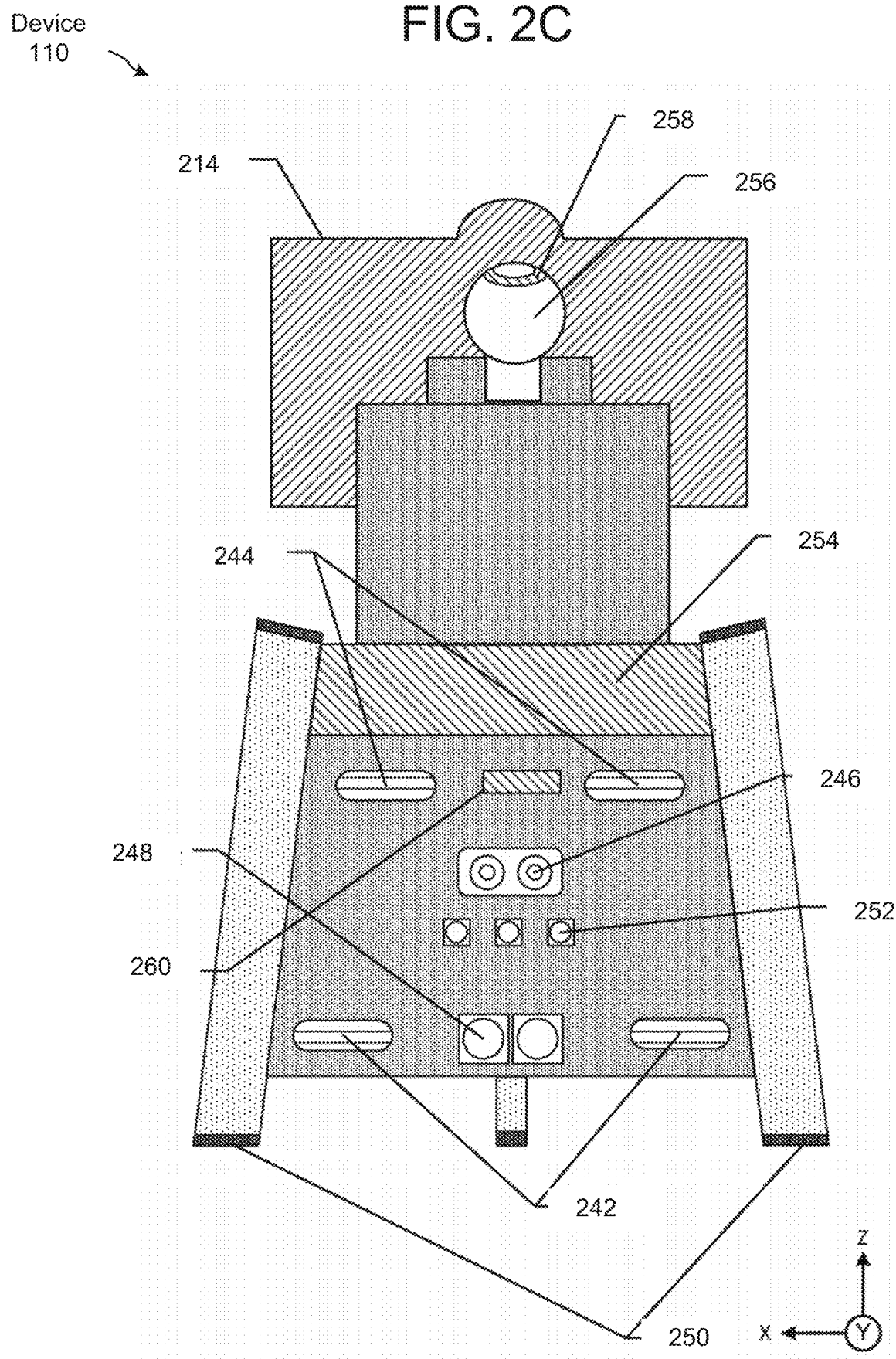

FIG. 2C illustrates a rear view of the device 110 according to various embodiments of the present disclosure. In this view, as with the front view, a first pair of optical sensors 242 are located along the lower edge of the rear of the robot 100, while a second pair of optical sensors 244 are located along an upper portion of the rear of the device 110. An ultrasonic sensor 246 may provide proximity detection for objects that are behind the device 110.

Charging contacts 248 may be provided on the rear of the device 110. The charging contacts 248 may include electrically conductive components that may be used to provide power (to, e.g., charge a battery) from an external source such as a docking station to the device 110. In other implementations, wireless charging may be utilized. For example, wireless inductive or wireless capacitive charging techniques may be used to provide electrical power to the device 110.

In some embodiments, the wheels 202 may include an electrically conductive portion 250 and provide an electrical conductive pathway between the device 110 and a charging source disposed on the floor. One or more data contacts 252 may be arranged along the back of the device 110. The data contacts 252 may be configured to establish contact with corresponding base data contacts within the docking station. The data contacts 252 may provide optical, electrical, or other connections suitable for the transfer of data.

Other output devices 260, such as one or more lights, may be disposed on an exterior of the back of the device 110. For example, a brake light may be arranged on the back surface of the device 110 to provide users an indication that the device 110 is slowing or stopping.

The device 110 may include a modular payload bay 254. In some embodiments, the modular payload bay 254 is located within the lower structure. The modular payload bay 254 may provide mechanical and/or electrical connectivity with the device 110. For example, the modular payload bay 254 may include one or more engagement features such as slots, cams, ridges, magnets, bolts, and so forth that are used to mechanically secure an accessory within the modular payload bay 254. In some embodiments, the modular payload bay 254 includes walls within which the accessory may sit. In other embodiments, the modular payload bay 254 may include other mechanical engagement features such as slots into which the accessory may be slid and engage. The device 110 may further include a mast 256, which may include a light 258.

FIG. 3 illustrates further details of the microphone array 210. In some embodiments, the microphone array 210 includes eight microphones 302a, 302b, 302c, 302d, 302e, 302f, 302g, and 302h, arranged in two concentric circles; the four microphones of one circle are rotated 45 degrees with respect to the four microphones of the other circle. The present disclosure is not, however limited to any particular number or arrangement of microphones. In particular, the autonomously motile device may feature only a single microphone.

The microphone array 210 may include a number of different individual microphones. The individual microphones may capture sound and pass the resulting audio signals created by the sound to downstream components, as discussed below. Each individual piece of audio data captured by a microphone may be in the time domain; these signals may be converted to the frequency domain using an analysis filterbank, as described below. Acoustic echo cancellation may be performed on each time-domain or frequency-domain signal individually or on groups of signals. The acoustic echo cancellation may be performed before or after processing the signals using the beamforming techniques described herein.

To isolate audio from a particular direction, as discussed herein, the device 110 may compare the audio data (or audio signals related to the audio data, such as audio signals in a sub-band domain) to determine a time difference of detection of a particular segment of audio data. If the audio data for a first microphone includes the segment of audio data earlier in time than the audio data for a second microphone, then the device 110 may determine that the source of the audio that resulted in the segment of audio data may be located closer to the first microphone than to the second microphone (which resulted in the audio being detected by the first microphone before being detected by the second microphone).

Figure 4A:
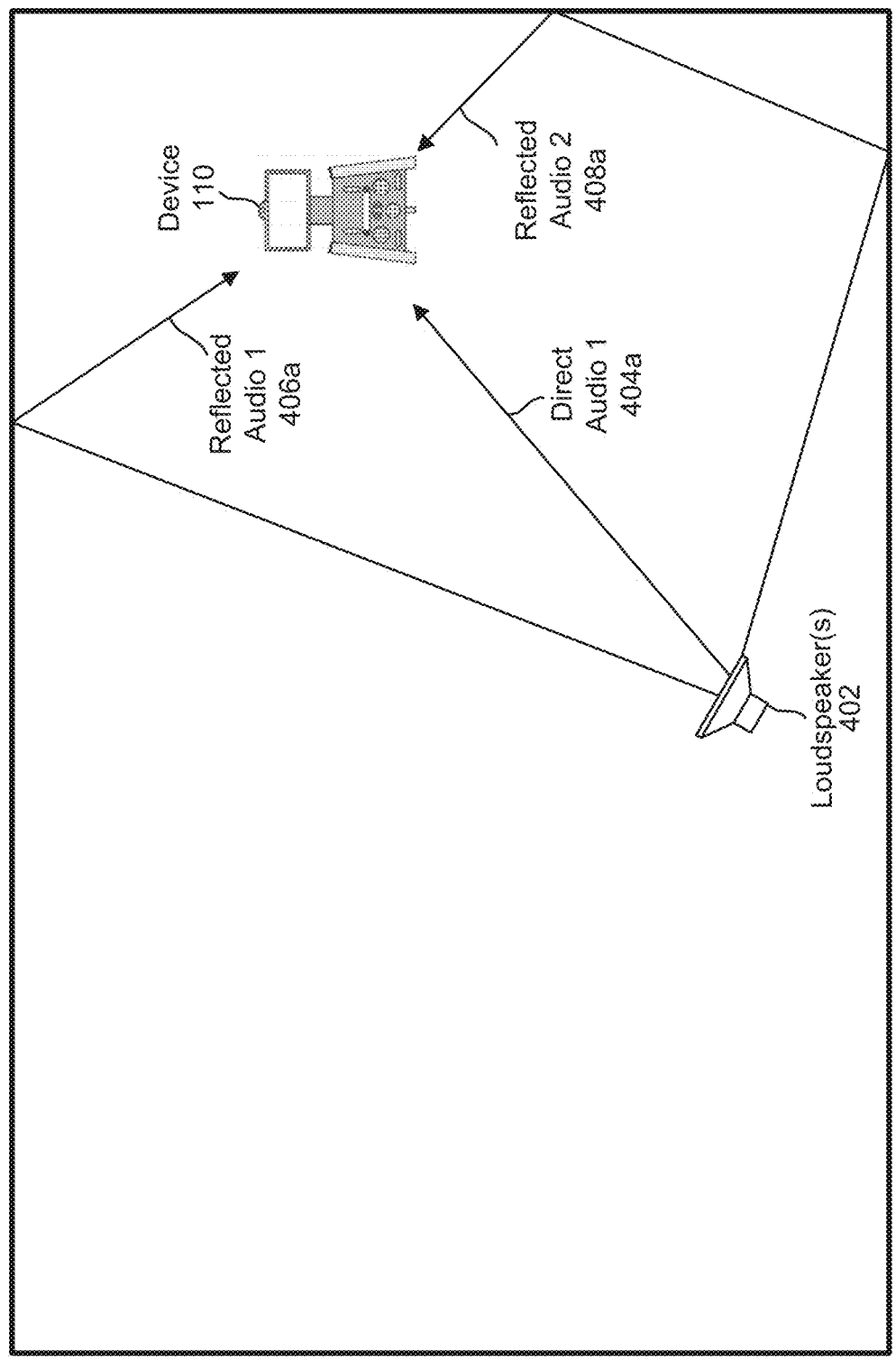

FIGS. 4A-4D illustrate an autonomously motile device 110 receiving near-end audio from a loudspeaker 402 according to embodiments of the present disclosure. Referring first to FIG. 4A, a loudspeaker 402 is disposed in an environment of the autonomously motile device 110. The loudspeaker 402 may be in communication with, and output audio in accordance with, a device such as a computer, tablet computer, cellular telephone, or other such advice. The autonomously motile device 110 may receive direct audio 404a from the loudspeaker 402. By "direct," the direct audio 404a passes through the environment and is received by a microphone 210 of the autonomously motile device 110 without reflecting off a surface of the environment. The direct audio 404a may, however, be attenuated in accordance with the distance between the loudspeaker 402 and the autonomously motile device 110.

The autonomously motile device 110 may further receive reflected audio 406a, 408a. The reflected audio 406a may reflect off one surface of the environment, while the reflected audio 408a may reflect off two surfaces of the environment. Any number of reflected audio and any number of reflections is, however, within the scope of the present disclosure. After a certain number of reflections, however, the reflected audio as received by the microphone 210 may be so attenuated that it is not perceptible.

FIG. 4B illustrates times that the audio is received by the microphone 210 and corresponding energy levels. For example, the direct audio 404a is received at first time $t_1$ and has a corresponding energy level $E_1$. The reflected audio 406a is received at a second time $t_2$ and has a corresponding energy level $E_2$. The reflected audio 408a is received at a third time $t_3$ and has a corresponding energy level $E_3$. The later times of the reflected audio 406a, 408a and lower energy levels of the reflected audio 406a, 408a may be due to the longer distance traveled and/or number of reflections.

Figure 4C:
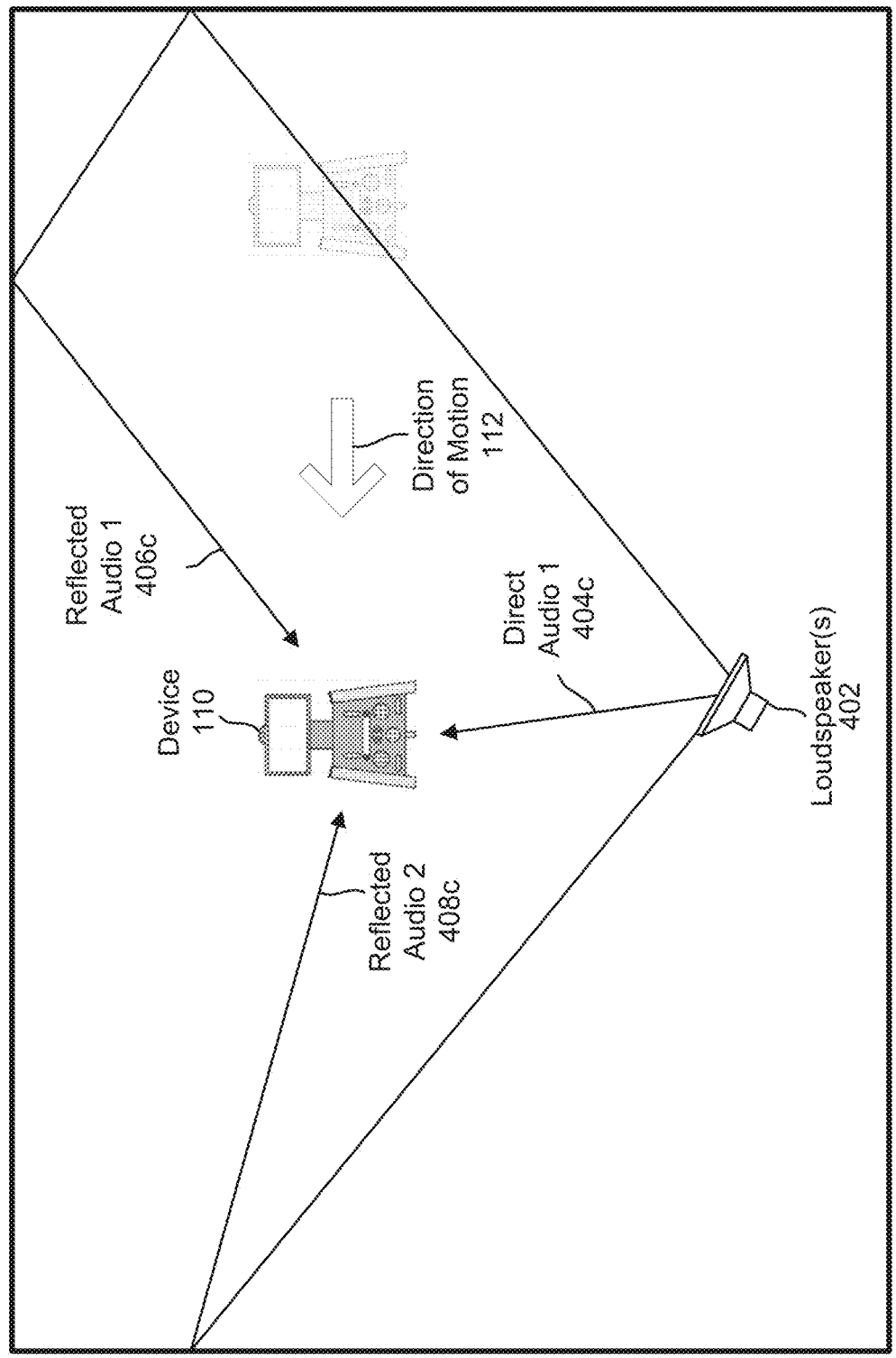

FIG. 4C illustrates an environment in which the autonomously motile device 110 has moved from a first position to a second position in accordance with a direction of motion 112 and a corresponding velocity. Because of the motion, the channel of the autonomously motile device 110 changes, as shown in FIGS. 4C and 4D. For example, the device now receives direct audio 404c, first reflected audio 406c, and second reflected audio 408c; this audio differs from that described in FIG. 4A due to the different channel. FIG. 4D illustrates that the direct audio 404b is received at first time $t_4$ (different from the time $t_1$) and has a corresponding energy level $E_4$ (similarly different from the energy level $E_1$). The reflected audio 406b is received at a second time $t_5$ and has a corresponding energy level $E_5$. The reflected audio 408b is received at a third time $t_6$ and has a corresponding energy level $E_6$.

FIGS. 4B and 4D may be referred to as depicting an impulse response $h_n$ of the environment. The impulse response may be represented by a system of L+1 taps in a delay line in accordance with the below equation (1).

$$h_n = [h_n(0)\ h_n(1) \ldots h_n(L)]^T \tag{1}$$

An acoustic echo signal y(n) may be defined by convolving the impulse response $h_n$ with a sample n of audio data x(n) as received by a microphone 302 in accordance with the below equation (2).

$$y(n) = h_n * x(n) = \sum_{l=0}^{L} h_n(l)x(n-l) \tag{2}$$

Figure 5A:
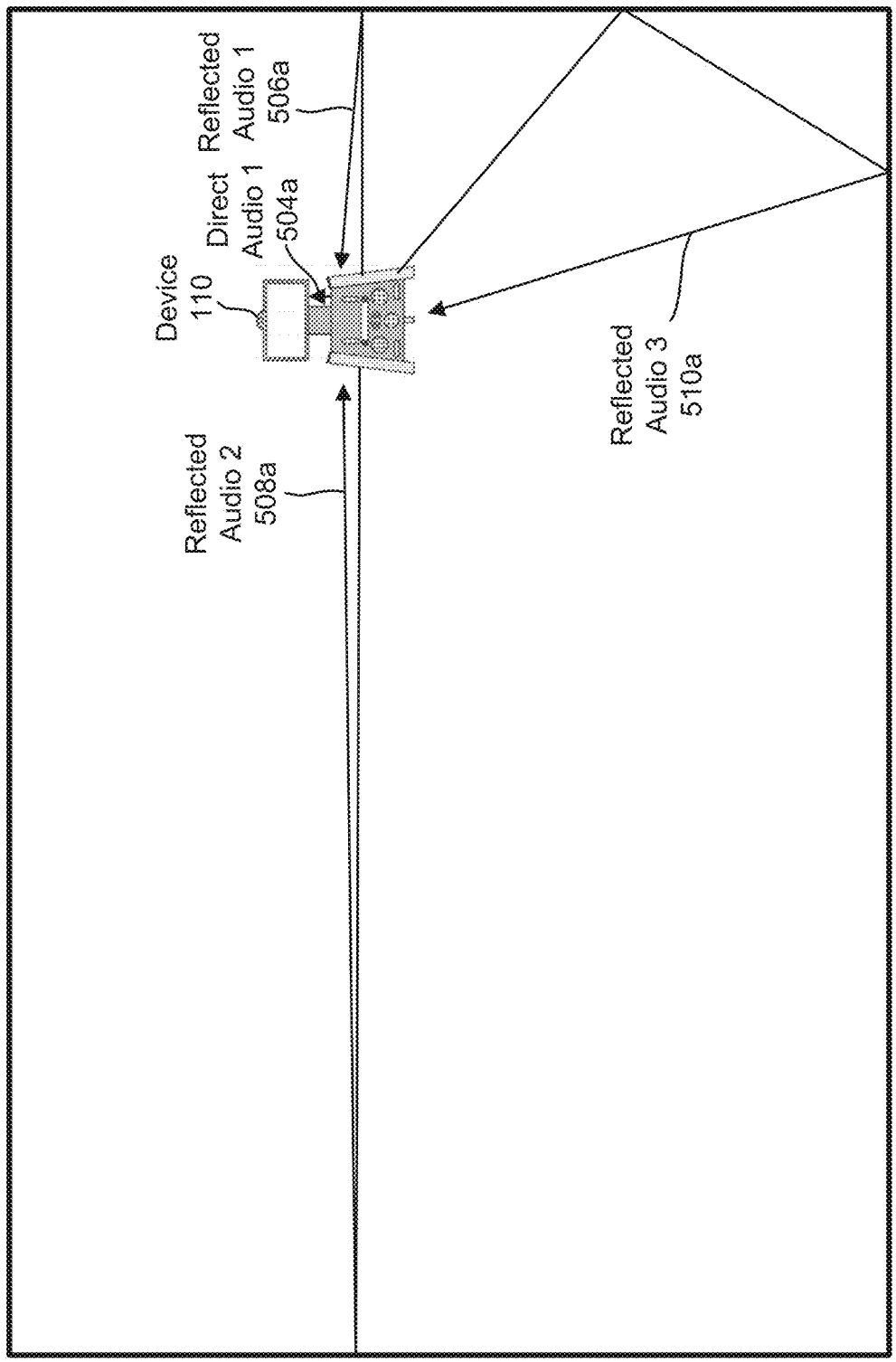

FIGS. 5A-5D illustrate the autonomously motile device 110 receiving near-end audio from its own loudspeaker 220 according to embodiments of the present disclosure. Referring first to FIG. 5A, the autonomously motile device 110 receives direct audio 504a output by the loudspeaker 220 and received by the microphone 210. The autonomously motile device 110 may also receive reflected audio 506a, 508a, 510a, as described above, as the audio output by the loudspeaker 220 is reflected off one or more reflective surfaces 108 of the environment. As described above, each audio may have a corresponding time of arrival $t_7$, $t_8$, $t_9$, $t_{10}$ and energy level $E_7$, $E_8$, $E_9$, $E_{10}$.

Figure 5B:
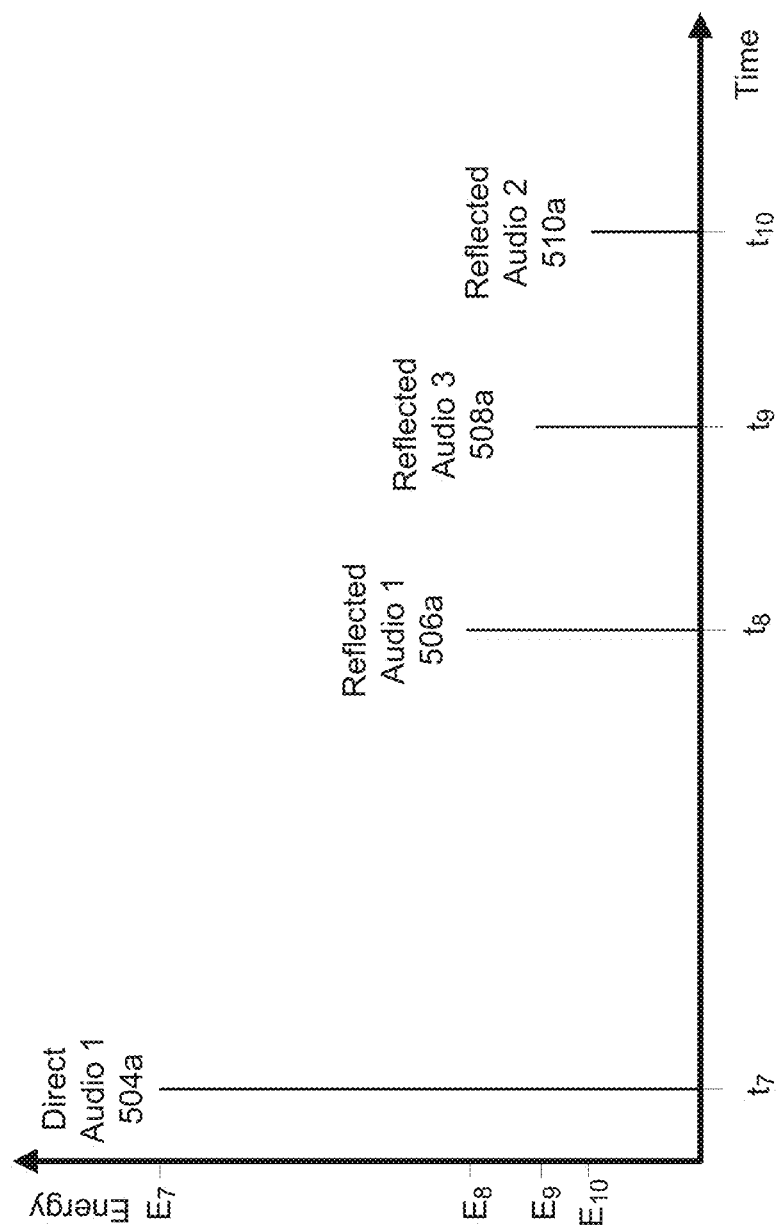
Figure 5C:
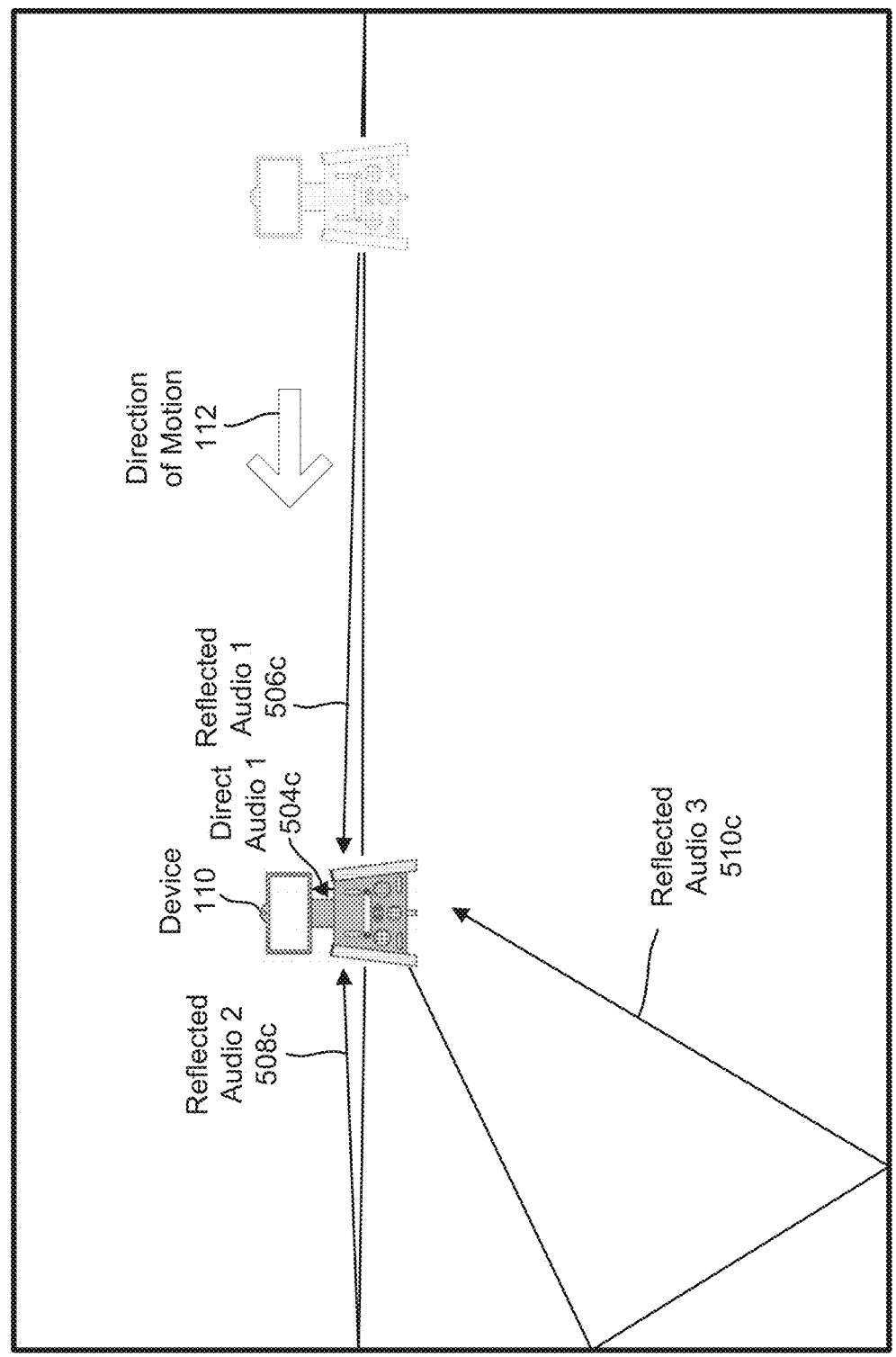

Like FIG. 4C, FIG. 5C illustrates an environment in which the autonomously motile device 110 has moved from a first position to a second position in accordance with a direction of motion 112 and a corresponding velocity. Similarly, because of the motion, the channel of the autonomously motile device 110 changes, as shown in FIGS. 5C and 5D. For example, the device now receives direct audio 504c, first reflected audio 506c, second reflected audio 508c, and third reflected audio 510c; this audio similarly differs from that described in FIG. 5A due to the different channel. As described above, each audio may have a corresponding time of arrival $t_7$, $t_{11}$, $t_{12}$, $t_{13}$ and energy level $E_7$, $E_{11}$, $E_{12}$, $E_{13}$ (which may be different from the times $t_8$, $t_9$, $t_{10}$ and energy levels $E_8$, $E_9$, $E_{10}$ of FIG. 5B. The time $t_7$ and energy level $E_7$ of the direct audio 504a may be the same as or similar to that of FIG. 5B at least because, due to the microphone 210 and loudspeaker 220 both being disposed on the autonomously motile device 110, the channel of the direct audio 504c may not change appreciably when the device 110 moves.

The impulse response $h_n$ of FIGS. 5B and 5D may be divided into two parts in accordance with the below equation (3).

$$h_n = h_n^S + h_n^M \tag{3}$$

The $h_n^S$ part of the impulse response represents a direct path between the loudspeaker 220 and a microphone 302; this part may not exhibit any Doppler shift because the loudspeaker 220 and a microphone 302, by virtue of both being attached to the autonomously motile device 110, have a relative velocity of zero with respect to each other even when the device 110 is moving relative to the environment. The $h_n^M$ part of the impulse response represents the part of the impulse response that includes reflections from reflective surfaces in the environment and does exhibit Doppler shift. The acoustic echo signal y(n) for when autonomously motile device 110 outputs audio when moving may thus be given by equation (4).

$$y(n) = \sum_{l=0}^{L} h_{n-l,n}(l) x(n - l) \quad (4)$$

In equation (4), $h_{n-l,n}(l)$ represents the impulse response at a particular location at time n and x(n−l) represents received audio at that location and at time n. Equation (5) may be derived by assuming that, at time n, the location of the autonomously motile device 110 is denoted by $p_n$; at time n−1, the location of the autonomously motile device 110 is denoted by $p_{n-1}$, and so on. The loudspeaker 220 outputs audio x(n-l) at times n-l, l=0, . . . , L (wherein L is the number of taps, as described in greater detail below). At time n, the microphone 302 receives audio y(n), which represents the output audio x(n), x(n−1), . . . , x(n−L) as modified by the channel.

The relationships between the output audio x(n-l) and the received audio y(n) may be represented by the below equation (5).

$$H_n \triangleq \begin{bmatrix} h_{n,n}^T \\ h_{n-1,n}^T \\ h_{n-2,n}^T \\ \vdots \\ h_{n-L,n}^T \end{bmatrix} = \begin{bmatrix} h_{n,n}(0) & h_{n,n}(1) & \ldots & h_{n,n}(L) \\ h_{n-1,n}(0) & h_{n-1,n}(1) & \ldots & h_{n-1,n}(L) \\ h_{n-2,n}(0) & h_{n-2,n}(1) & \ldots & h_{n-2,n}(L) \\ & & \vdots & \\ h_{n-L,n}(0) & h_{n-L,n}(1) & \ldots & h_{n-L,n}(L) \end{bmatrix} \quad (5)$$

The rows of the matrix $H_n$ thus represent the impulse responses between the loudspeaker 220 and microphone 302 at various locations. The acoustic echo signal y(n) may thus depend on only the diagonal values of the matrix $H_n$.

Figure 6B:
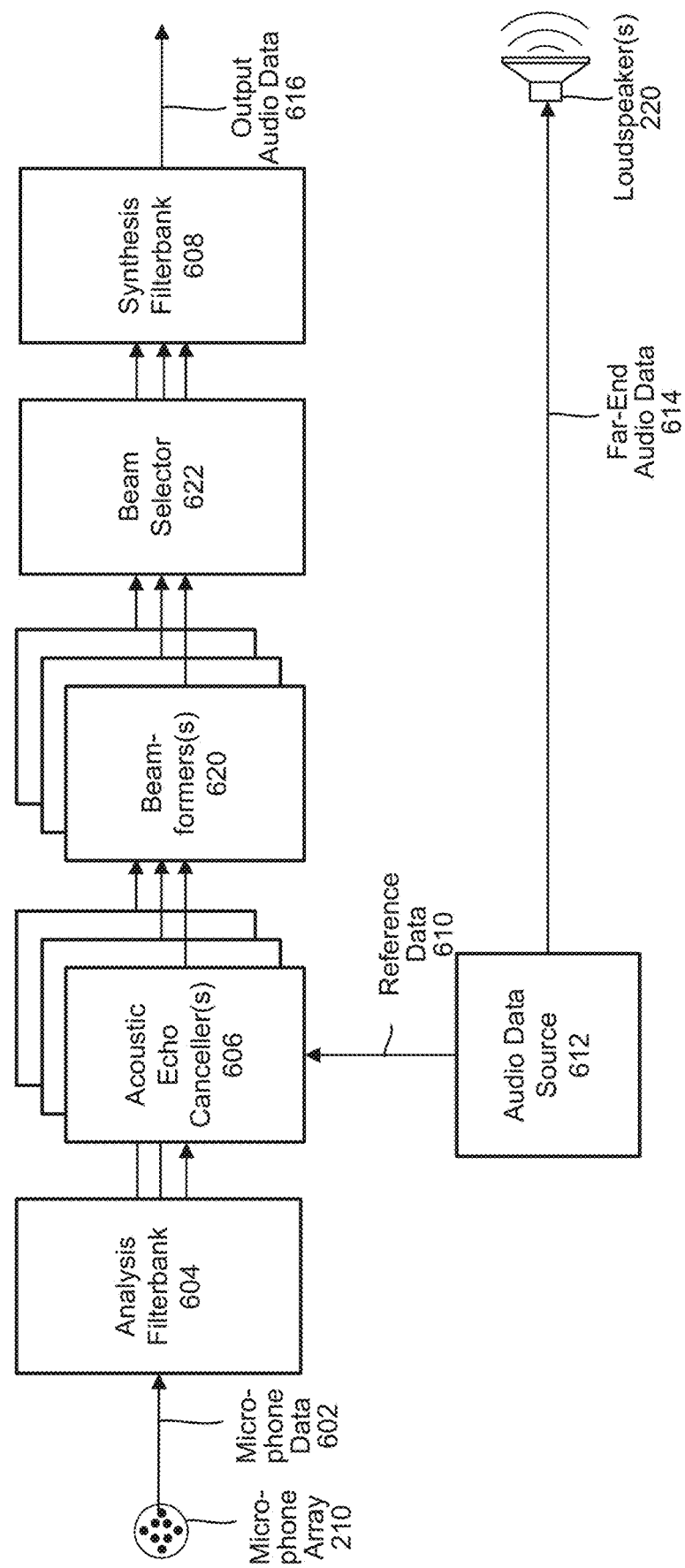

FIGS. 6A and 6B illustrate systems for audio processing that include acoustic echo cancellation, which includes compensation for Doppler-shifted output audio reflections according to embodiments of the present disclosure. For clarity, single instances of each component of the system may be illustrated; one of skill in the art will understand, however, that the system may include multiple instances of each component in accordance with each microphone 302 of the microphone array 210, each frequency bin, and/or each reference signal. In some embodiments, the system includes eight microphones and 128 frequency bins. An overview of the system is first presented in the below paragraphs; each component is then described in greater detail.

In various embodiments, the microphone 302 receives audio corresponding to the environment of the device 110 and transduces the audio into microphone data 602. An analysis filterbank 604 converts the audio data 602 into frequency-domain audio data and may further separate the frequency-domain audio data into two or more frequency ranges or "bins." An acoustic-echo cancellation component 606 may be used to remove reference audio data 610 from the frequency-domain audio data; this reference audio data 610 may be received from an audio data source 612, such as a far-end participant on a voice or video call. The output audio data 614 may be output using a loudspeaker 220; the microphone data 602 may include at least a portion of the output audio data 614 and/or reflections of the output audio data 614.

The analysis filterbank 604 may perform a Fourier transform, such as a fast Fourier transform (FFT), and may include one or more uniform discrete Fourier transform (DFT) filterbanks, which convert the time-domain audio data 602 into the frequency-domain audio data 606. The frequency-domain audio data 606 may include a plurality of audio signals Y in the sub-band domain. The audio signals Y may incorporate audio signals corresponding to multiple different microphones 302 (as shown in FIG. 6B) as well as different sub-bands (i.e., frequency ranges) as well as different frame indices (i.e., time ranges). Thus, the audio data 602 from the mth microphone 302 may be represented as $X_m(k,n)$, where k denotes the sub-band index, and n denotes the frame index. The combination of all audio signals for all m microphones 302 for a particular sub-band index frame index may be represented as X(k,n).

The acoustic-echo cancellation component 606 may subtract reference audio data 610 from the frequency-domain audio data using, for example, hardware and/or software configured to subtract data representing a first signal from data representing a second signal. The acoustic-echo cancellation component 606 may include an adaptive filter, such as a finite impulse-response (FIR) filter, that is configured to minimize an error signal between an output of the filter and the near-end audio. Multiple acoustic echo cancellers 606 may be used for each microphone 302 and/or for each frequency bin. Multiple acoustic echo cancellers 606 may further be used for multiple reference signals 708, such as left-and-right stereo reference signals. As explained in greater detail below with respect to FIGS. 7A, 7B, and 7C, the acoustic echo canceller 606 may determine, based on a velocity of the autonomously motile device 110, an operating parameter such as a step size and/or number of iterations to be used when determining updated filter coefficients.

A synthesis filterbank 608 may be used to convert the frequency-domain data back to time-domain output audio data 616 using, for example, an inverse Fourier transform (such as an Inverse Fast Fourier Transform (IFFT). The output audio data 616 may then be used for further audio processing, such as speech processing.

The acoustic echo canceller 606 may, as described above, determine an estimate of the channel for each of a plurality of reference signals and frequency bins. The acoustic echo canceller 606 may determine these estimates over time for each of a plurality of audio samples. In some embodiments, each sample corresponds to a frame of audio data, which may be 10 milliseconds in size. In other embodiments, a frame of audio data includes a plurality of audio samples. The estimate $\hat{y}_p(m,n)$ may be determined in accordance with the below equation (6).

$$\hat{y}_p(m, n) = \sum_{r=0}^{L-1} x_p(m, n - r) w_p^r(m, n) \quad (6)$$

In this equation, m denotes the frequency bin number, n denotes the sample number, and p denotes the reference signal number. The variable w denotes a vector of filter coefficients and is defined by the below equation (7).

$$\underline{w}_p(m,n) \triangleq [w_p^0(m,n)\ w_p^1(m,n) \ldots w_p^{L-1}(m,n)] \quad (7)$$

The filter coefficients may be updated according to a normalized least mean squares algorithm, as defined by equation (8) below.

$$w_p(m, n) = w_p(m, n-1) + \frac{\mu_p(m, n)}{\|x_p(m, n)\|^2 + \xi} x_p(m, n) e(m, n) \qquad (8)$$

In the above equation, $\mu_p(m,n)$ is the adaptation step-size for reference signal p, bin m, and sample n, and e(m,n) is the output of the acoustic echo canceller 606.

FIG. 6B is similar to FIG. 6B in that it depicts an audio processing system that includes at least one analysis filterbank 604, at least one acoustic echo canceller 606, and at least one synthesis filterbank 608. The system of FIG. 6B, however, includes the microphone array 210 that includes more than one microphone 302. One or more beamformers 620 may process the data from the microphone array 210 to determine two or more beams; a beam selector 622 may select one or more of the beams.

In various embodiments, the beamformer 620 is a fixed or adaptive beamformer configured to determine directional audio data in accordance with values of a matrix, referred to herein as a covariance matrix. The beamformer 620 boosts audio from a target direction while suppressing audio from other directions As described herein, beamforming (e.g., performing a direction-based separation of audio data) corresponds to generating a plurality of directional audio signals (e.g., beamformed audio data) corresponding to individual directions relative to the microphone array 210. A first beam may correspond to first beamformed audio data associated with a first direction (e.g., portions of the input audio signals corresponding to the first direction), a second beam may correspond to second beamformed audio data associated with a second direction (e.g., portions of the input audio signals corresponding to the second direction), and so on. As used herein, "beams" refer to the beamformed audio signals that are generated by the beamforming operation. Therefore, a first beam corresponds to first audio data associated with a first direction, whereas a first directional calculation corresponds to the first filter coefficient values used to generate the first beam.

For example, the beamforming operation may individually filter input audio signals generated by multiple microphones 302 in the microphone array 210 (e.g., first audio data associated with a first microphone, second audio data associated with a second microphone, etc.) in order to separate audio data associated with different directions. Thus, first beamformed audio data corresponds to audio data associated with a first direction, second beamformed audio data corresponds to audio data associated with a second direction, and so on.

To perform the beamforming operation, the beamformer 620 may apply directional calculations to the input audio signals. In some examples, the beamformer 620 may perform the directional calculations by applying filters to the input audio signals using filter coefficient values associated with specific directions. For example, the beamformer 620 may perform a first directional calculation by applying first filter coefficient values to the input audio signals to generate the first beamformed audio data and may perform a second directional calculation by applying second filter coefficient values to the input audio signals to generate the second beamformed audio data.

In one example of a beamformer system, a fixed beamformer employs a filter-and-sum structure to boost an audio signal that originates from a desired direction (sometimes referred to as the look-direction) while largely attenuating audio signals that original from other directions. A fixed beamformer unit may effectively eliminate certain diffuse noise (e.g., undesirable audio), which is detectable in similar energies from various directions, but may be less effective in eliminating noise emanating from a single source in a particular non-desired direction. The beamformer may further include an adaptive beamformer that may adaptively cancel noise from different directions, depending on audio conditions.

Beamforming may be performed by determining filter coefficient values (e.g., Finite Impulse Response (FIR) filter coefficient values) for each beam direction (e.g., look direction, direction of interest, etc.) based on a position of physical microphones in the microphone array 210. For example, a first position of a first physical microphone may correspond to a first filter coefficient associated with a first direction and a second position of a second physical microphone may correspond to a second filter coefficient associated with the first direction. Thus, to generate beamformed audio data in the first direction, the beamformer may apply the first filter coefficient value to first audio data captured by the first physical microphone and apply the second filter coefficient value to second audio data captured by the second physical microphone.

The filter coefficient values may be determined using minimum variance distortionless response (MVDR) beamformer techniques, Linearly Constrained Minimum Variance (LCMV) beamformer techniques, and/or generalized eigenvalue (GEV) beamformer techniques, although the disclosure is not limited thereto and the filter coefficient values may be determined using any technique known to one of skill in the art without departing from the disclosure.

The filter coefficient values used to perform the beamforming operations may be calculated offline (e.g., preconfigured ahead of time) and stored in the device 110. In various embodiments, a computer model of the device 110 may be constructed using, for example, computer-aided design (CAD) software. The model may then be analyzed using a finite-element model (FEM) application; based on the FEM analysis, the acoustic properties of each microphone 302 may be determined for each incident angle. These properties may then be used to determine the values of the above-referenced matrices.

A beam selector 622 receives the two or more adapted beam data and, in accordance with the various techniques described herein, such as selecting a loudest beam, selects data corresponding to a selected beam. The beam selector 622 may select one or more of the beams as output beams. For example, the beam selector 622 may determine one or more signal quality values (e.g., loudness, SNR, power value, signal-to-noise plus interference ratio (SINR), and/or other signal quality metrics known to one of skill in the art) associated with each of the adapted beam data and may select the adapted beam data having the highest signal quality metric as the selected beam. In various embodiments, the beam selector 622 is capable of selecting a new beam every 100-200 milliseconds.

FIGS. 7A-7C illustrate acoustic echo cancellation systems according to embodiments of the present disclosure. Referring first to FIG. 7A, an acoustic echo canceller 606a includes an adaptive filter 702 that receives reference audio data 708 from, for example, a local source of music, a far-end speaker, or other source. A summation component 706 subtracts the output of the adaptive filter 702 from input audio data 704 (received from the analysis filterbank 604, beamformer 620, or beam selector 622) to create output audio data 710. The adaptive filter 702 thus models the audio channel between a microphone 302 and the loudspeaker 220. The output of the adaptive filter 702 thus represents an approximation of audio as received by the microphone 302. As explained in greater detail below, the adaptive filter 702 computes updated filter coefficients based on the output audio data 710 using a step size. The step size may be determined by a step-size determination component 712, which outputs step-size data 714. The adaptive filter 702 may further iterate its coefficient-determination step a number of times on the same audio sample n in accordance with iteration number data 718 as determined by an iteration number determination component 716. These two components 712, 716 may determine their outputs based on velocity data 720, which represents a velocity of the device 110. The velocity data may be generated by processing the outputs of one or more sensors, such as an accelerometer or wheel-speed sensor.

The adaptive filter 702 may include one or more adjustable FIR filters that estimate the acoustic properties of a channel of the environment of the device 110 based on one or more transfer functions. The portion of the audible sound output by the loudspeaker 220 that reaches the microphone array 210 may be characterized based on one or more transfer functions. The number of transfer functions may vary depending on the number of loudspeakers 220 and/or microphones 302. For example, a first portion of the sound output by the loudspeaker 220 and captured by a first microphone 302 in the microphone array 210 may be characterized by a first transfer function, and a second portion of the sound output by the loudspeaker 220 and captured by a second microphone in the microphone array 210 may be characterized by a second transfer function. The transfer functions may vary with the relative positions of the components and the acoustics of the room (e.g., environment surrounding the device 110). If the position of all of the objects in the room are static, the transfer functions are likewise static. When the device 110 moves, however, the transfer functions may change.

To illustrate an example, the adaptive filter 702 may determine an estimated transfer function that models an acoustic path between the loudspeaker 220 and an individual microphone 302 in the microphone array 210. Thus, the adaptive filter 702 may include a first estimation filter block that uses a first estimated transfer function to model a first transfer function between the loudspeaker 220 and the first microphone 302 of the microphone array 210, a second estimation filter block that uses a second estimated transfer function that models a second transfer function between the loudspeaker 220 and a second microphone 302, and so on. The adaptive filter 702 may alter the characteristics of its transfer functions by altering one or more filter coefficients, as described above. The values of the filter coefficients may be determined and/or adjusted based at least in part on error data determined by the summation component 706. The error data may correspond to a change in magnitude of the output of the summation component 706.

The step-size determination component 712 determines the step size used to update the filter coefficients, as described above. The step-size determination component 712 may determine the step size based on the velocity of the autonomously mobile device; the step size may be small for small velocities and large for large velocities. In some embodiments, a maximum step size is determined; this maximum step size may be, for example, 0.1. The step-size determination component 712 may determine the step size by scaling the maximum step size in accordance with a ratio of a current velocity to a maximum velocity. For example, if the maximum velocity is one meter per second and the maximum step size is 0.1, the step size may be 0.075 when the velocity is 0.75 meters per second. A minimum step size, for example 0.01, may also be defined.

In other embodiments, the step-size determination component 712 may determine the step size based on a nonlinear curve. The nonlinear curve may cause the step size to increase or decrease more rapidly in response to increases or decreases in velocity when the absolute value of the velocity is small (e.g., near zero); the nonlinear curve may cause the step size to increase or decrease less rapidly in response to increases or decreases in velocity when the absolute value of the velocity is large (e.g., near the maximum velocity).

In some embodiments, the nonlinear curve is a sigmoid function, which may depend on two parameters: (a) point of inflection, denoted by ρ, and (b) slope of the curve around the point of inflection, denoted by γ. Using these parameters, the sigmoid function output η for an input x is given by the below equation (9).

$$\eta = 0.5\left(1 + \frac{v}{1+|v|}\right) \quad (9)$$

The parameter v is given by the below equation (10).

$$v = \gamma(x-\rho) \quad (10)$$

In some embodiments, the parameters ρ and γ are assigned the values ρ=0.05, γ=20. The sigmoid function output η may then be used to determine the step size by multiplying it against the maximum step size. If the result is less than the minimum step size, the step size is defined as the minimum step size.

In some embodiments, in addition to the step size being a function of velocity, the step size may further depend on a power level of a corresponding frequency bin. Like the velocity-based scaling factor, a power-based scaling factor may be determined using a similar sigmoid function, which may use similar parameter values of ρ=0.02, γ=20. The step size may therefore be determined by multiplying the maximum step size by both the velocity-based scaling factor and the power-based scaling factor. The power-based scaling factor may be small for small power levels and large for large power levels.

An iteration number determination component 716 may determine iteration number data 718 that represents a number of times that the adaptive filter should iterate (e.g., determine an updated set of filter coefficients) for a single audio sample n. If the device 110 has a high velocity, the channel may be changing rapidly, and the number of iterations may be high (e.g., four iterations) to accurately model the changing channel. If the device has a low or zero velocity, the channel may be changing slowly, and the number of iterations may be low (e.g., one or two iterations).

The number of iterations may be defined as K(m,n), which represents the number of iterations K for given frequency bin m and time-step n. A minimum number of iterations may be defined as $K_{min}$, (e.g., one or two iterations), and a maximum number of iterations may be defined as $K_{max}$ (e.g., four iterations). A Doppler spread $f_m$ may be defined as a range of frequencies over which audio received by the microphone array 210 varies for a given output frequency. For example, if the loudspeaker 220 outputs a 1 kHz tone and the microphone array 210 receives, in response, audio data that varies from 0.95 kHz to 1.05 kHz, the Doppler spread $f_m$ may be 100 Hz. A coherence time $T_c$ may be defined as a time duration in which the channel remains approximately the same (i.e., the characteristics of the channel remain approximately constant during the coherence time $T_c$). During the coherence time $T_c$, a single set of filter coefficients may be used to model the channel. The coherence time $T_c$ may be approximately equal to the inverse of the Doppler spread $f_m$. One relationship between the coherence time $T_c$ and the Doppler spread $f_m$ is given by the below equation (11).

$$T_c = \frac{0.42}{f_m} \tag{11}$$

For a given velocity, the Doppler spread $f_m$ is larger for higher frequencies at least because the channel changes more quickly when considering higher frequencies. To account for these changes, the number of iterations may be greater for high-frequency bins and less for low-frequency bins. To compute K as a function of time and frequency, the maximum Doppler spread possible for the device 110 may be determined. The maximum Doppler spread may be determined by choosing a highest frequency of interest (e.g., 8 kHz) and the maximum device velocity (e.g., 1 m/s). For example, at 8 kHz and 1 m/s the largest Doppler spread may be 47 Hz. For a given frequency and velocity, a normalized Doppler spread may be determined by dividing a current Doppler spread into the maximum Doppler spread. This normalized Doppler spread may be used as a input to a function, such as a sigmoid curve as described above; the sigmoid curve may have parameters $\rho=0.125$, $\gamma=10$. The sigmoid curve may be designed such that the number of iterations falls within $K_{min}$ and $K_{max}$. For example, FIG. 9B shows the number of iterations as a function of normalized Doppler spread.

Given the number of iterations K, the coefficient-update equation (8) above may be updated in accordance with the below equation (12).

$$\underline{w}_p^k(m,n) = \underline{w}_p^{k-1}(m,n) + \frac{\mu_p(m,n)}{\|\underline{x}_p(m,n)\|^2 + \xi} \underline{x}_p(m,n) e^k(m,n), \tag{12}$$
$$k = 1, \ldots, K$$

In equation (12), k is the iteration index, and K is the total number of iterations for a frequency bin m and a sample n. A last coefficient of a previous sample may be equal to a first coefficient of a present frame in accordance with the below equation (13).

$$\underline{w}_p^0(m,n) \triangleq \underline{w}_p^K(m,n-1) \tag{13}$$

The error term $e^k(m,n)$ for iteration k is defined by the below equation (14).

$$e^k(m,n) = d(m,n) - \hat{y}^k(m,n) \tag{14}$$

The acoustic echo signals of the above equations are defined by the below equations (15) and (16).

$$\hat{y}^k(m,n) = \sum_{p=1}^{P} \hat{y}_p^k(m,n) \tag{15}$$

$$\hat{y}_p^k(m,n) = \sum_{r=0}^{L-1} x_p(m, n-r) w_p^{k-1,r}(m,n) \tag{16}$$

The adaptive filter may thus compute filter coefficients in accordance with the step-size data 714 and the iteration number data 718.

FIG. 7B illustrates an acoustic echo canceller 606b that includes an adaptive filter 702, a summation component 706, a step-size determination component 712, and an iteration number determination component 716. Each of these components may operate in accordance with the similar components described above with reference to FIG. 7A. The acoustic echo canceller 606b of FIG. 7B further includes, however, a next-sample data determination component 722. The next-sample data determination component 722 may, for a given sample n, use, as a starting point for computing updated filter coefficients for that sample, filter coefficients computed for a previous sample n−1. In some embodiments, if the number of iterations is greater than one, the next-sample data determination component 722 selects filter coefficients corresponding to a first iteration of the previous sample n−1 in accordance with the below equation (17).

$$\underline{w}_p^0(m,n) \triangleq \underline{w}_p^1(m,n-1) \tag{17}$$

In other embodiments, the next-sample data determination component 722 selects one set of filter coefficients computed for the various iterations of the previous sample n−1 based on one or more criteria, such as a quality metric. The quality metric may be, for example, a minimum error value as output by the summation component 706. The next-sample data determination component 722 may thus store, in a computer memory, sets of coefficients computed for each iteration of the previous sample n−1 and associated quality metrics and, upon receipt of a current sample n, select a set of coefficients having the best quality metric.

FIG. 7C illustrates an acoustic echo canceller 606c. Like FIG. 7B, the acoustic echo canceller 606c includes an adaptive filter 702, a summation component 706, a step-size determination component 712, and an iteration number determination component 716. Each of these components may operate in accordance with the similar components described above with reference to FIG. 7A.

The acoustic echo canceller 606c includes, however, a first adaptive filter 702a and a second adaptive filter 702b and corresponding first and second summation components 706a, 706b. The step-size determination component 712 determines first step-size data 714a, which is received by the first adaptive filter 702a, and second step-size data 714b, which is received by the second adaptive filter 702b. The first step-size data 714a may represent a first step size that is less than a second step size represented by the second step-size data 714b. The first step size may be, for example, ten times less than the second step size. The step-size determination component 712 may first determine the second step size as described above, and then determine the first step size by dividing the second step size by a factor (e.g., ten). In other embodiments, the first step size is fixed at a small value (e.g., 0.01).

Because the first adaptive filter 702a thus receives a smaller step size than the second adaptive filter 702b, the first adaptive filter 702a may change more slowly than the second adaptive filter 702b. The two adaptive filters 702a, 702b may thus model different parts of the impulse response of the environment: a first, slowly-changing part that corresponds to the direct path between the loudspeaker 220 and microphone array 210 (modeled by the first adaptive filter 702a) and a second, quickly changing part that corresponds to reflections caused by reflective surfaces as the device 110 moves in the environment (modeled by the second adaptive filter 702b). The first summation component 706a subtracts the output of the first adaptive filter 702a from input audio data 704; the second summation component 706b subtracts the output of the second adaptive filter 702b from error data 722 output by the first summation component 706a to generate output audio data 710.

Figure 8:
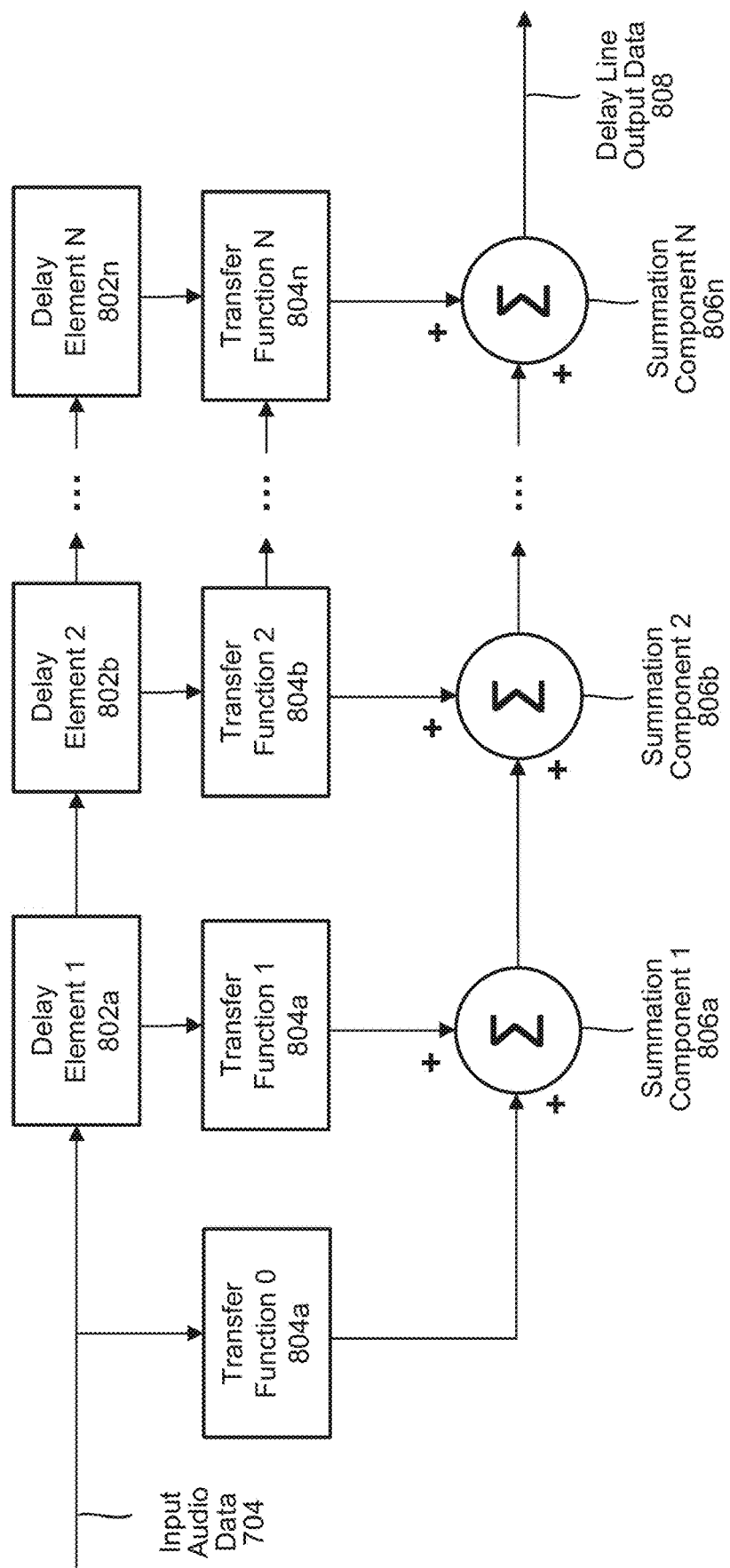
FIG. 8 illustrates a tap delay line according to embodiments of the present disclosure.

FIG. 8 illustrates a tap delay line in accordance with embodiments of the present disclosure. As mentioned above, the adaptive filter 702 may be implemented using the tap delay line. The number of taps in the delay line may correspond to a number of impulses modeled for the environment. For example, if the delay line has 10 taps, the adaptive filter 702 may model the impulse response of the environment using 10 impulses (e.g., one direct path and nine reflections).

The tap delay line may receive reference audio data 708 and process it using a number of delay elements 802. Each delay element 802 may delay the reference audio data 708 by the same or different amounts (e.g., 0.1 millisecond, 1 millisecond, etc.). Each delay element 802 may be a filter, such as an FIR filter, that delays the reference audio data 708 but does not change the phase of the reference audio data 708.

The tap delay line may further include a number of transfer function components 804. Each transfer function component 804 may correspond to the impulse response of the direct path or reflection at a corresponding delay. Each transfer function component 804 may thus include an adaptive filter, as described above. A first transfer function component 804a may process the reference audio data 708 directly (corresponding to the direct path), while the rest of the transfer function components 804 process the reference audio data 708 after it has been processed by one or more delay elements 802. Summation components 806 may sum the outputs of the transfer function components 804 to generate delay-line output data 808, which may correspond to the output of the adaptive filter 702.

Figure 9A:
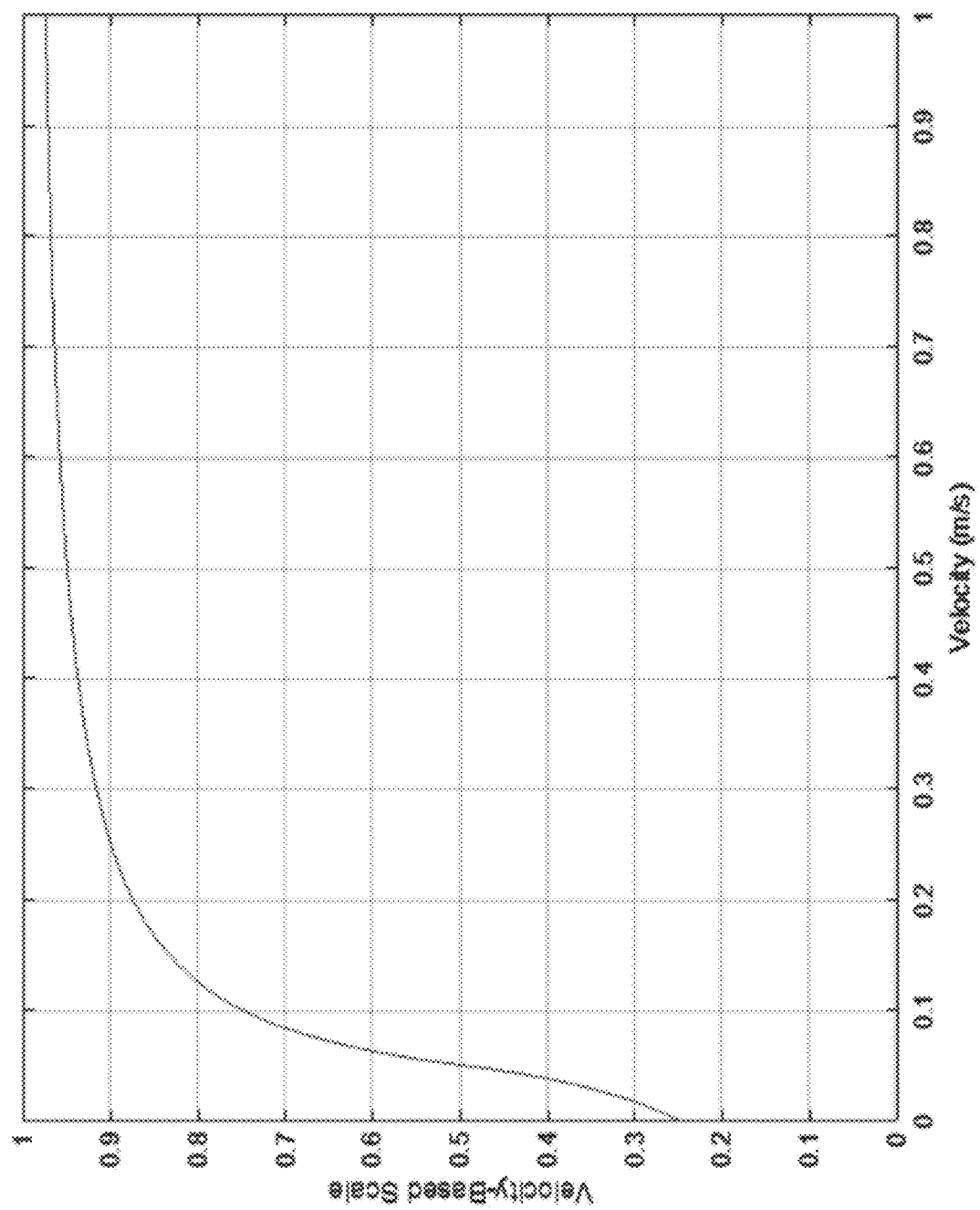
FIGS. 9A-9C illustrate curves for determining values according to embodiments of the present disclosure.
Figure 9B:
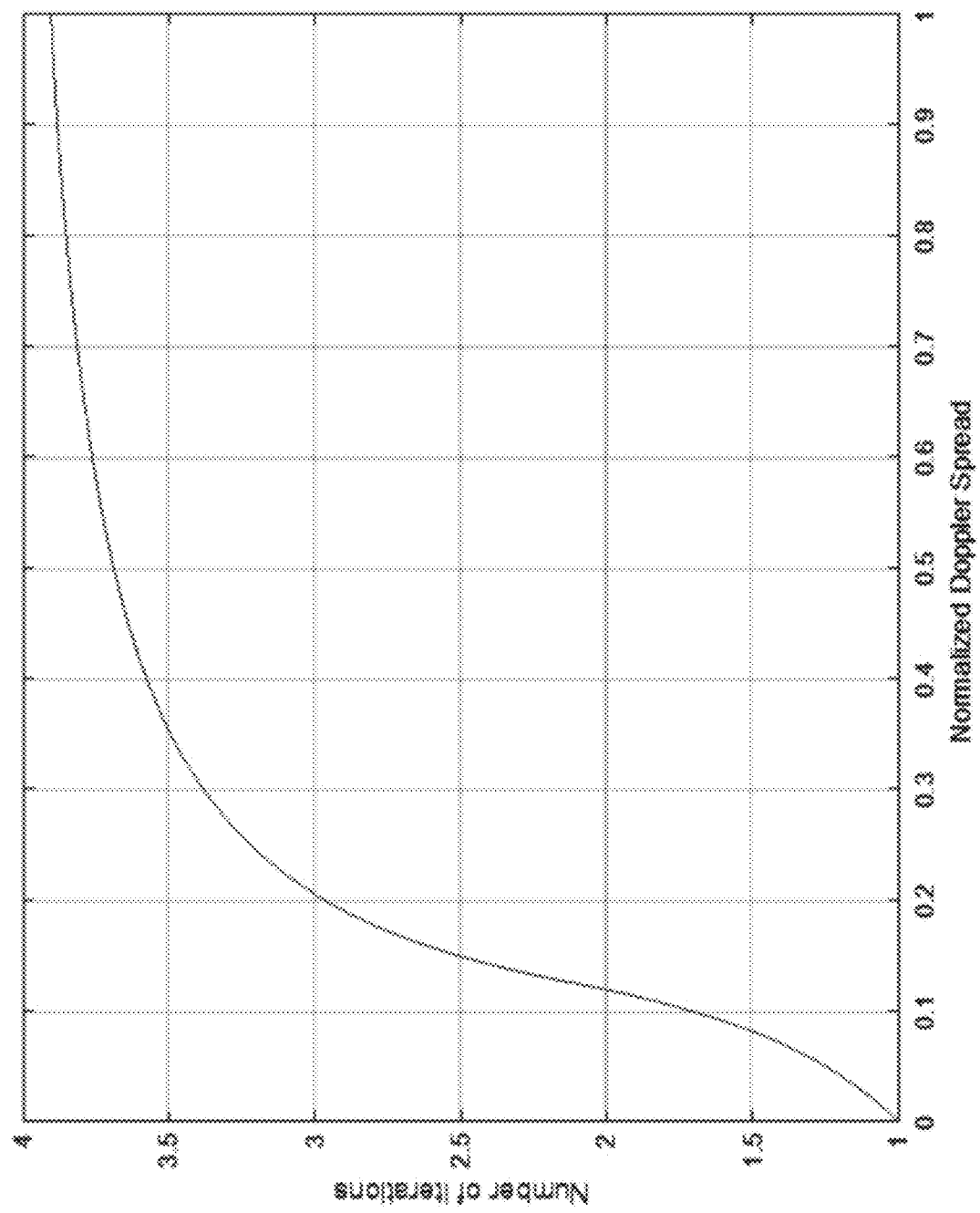
Figure 9C:
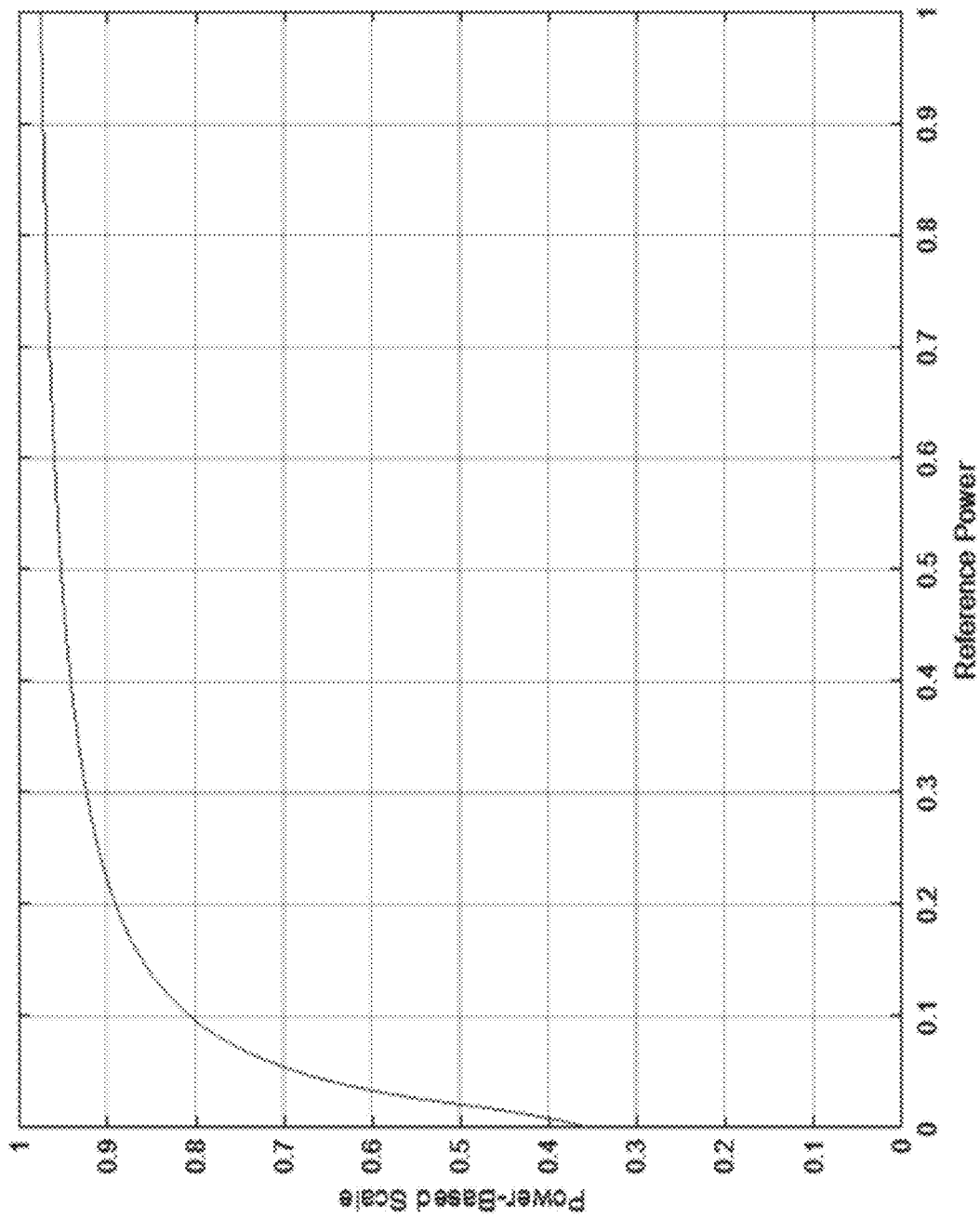

FIGS. 9A, 9B, and 9C represent sigmoid functions, as described above. FIG. 9A illustrates a sigmoid function that generates a velocity-based scaling factor given a velocity. FIG. 9B illustrates a sigmoid function that generates a number of iterations given a normalized Doppler spread. FIG. 9C illustrates a sigmoid function that generates a power-based scaling factor given a reference power level.

FIG. 10 is a block diagram conceptually illustrating example components of the device 110. In operation, the device 110 may include computer-readable and computer-executable instructions that reside on the device, as will be discussed further below.

The device 110 may include one or more audio capture device(s), such as a microphone array 210 which may include a plurality of microphones. The audio capture device(s) may be integrated into a single device or may be separate. The device 110 may also include a built-in audio output device for producing sound, such as built-in loudspeaker(s) 220. The audio output device may be integrated into a single device or may be separate. The device 110 may include an address/data bus 1024 for conveying data among components of the device 110. Each component within the device may also be directly connected to other components in addition to (or instead of) being connected to other components across the bus 1024.

The device 110 may include one or more controllers/processors 1004, which may each include a central processing unit (CPU) for processing data and computer-readable instructions, and a memory 1006 for storing data and instructions. The memory 1006 may include volatile random access memory (RAM), non-volatile read only memory (ROM), non-volatile magnetoresistive (MRAM) and/or other types of memory. The device 110 may also include a data storage component 1008, for storing data and controller/processor-executable instructions (e.g., instructions to perform operations discussed herein). The data storage component 1008 may include one or more non-volatile storage types such as magnetic storage, optical storage, solid-state storage, etc. The device 110 may also be connected to removable or external non-volatile memory and/or storage (such as a removable memory card, memory key drive, networked storage, etc.) through the input/output device interfaces 1202.

Computer instructions for operating the device 110 and its various components may be executed by the controller(s)/processor(s) 1004, using the memory 1006 as temporary "working" storage at runtime. The computer instructions may be stored in a non-transitory manner in non-volatile memory 1006, storage 1008, or an external device. Alternatively, some or all of the executable instructions may be embedded in hardware or firmware in addition to or instead of software.

The device 110 may include input/output device interfaces 1002. A variety of components may be connected through the input/output device interfaces 1002, such as the microphone array 210, the built-in loudspeaker(s) 220, and a media source such as a digital media player (not illustrated). The input/output interfaces 1002 may include A/D converters (not illustrated) and/or D/A converters (not illustrated).

The input/output device interfaces 1002 may also include an interface for an external peripheral device connection such as universal serial bus (USB), FireWire, Thunderbolt or other connection protocol. The input/output device interfaces 1002 may also include a connection to one or more networks 1099 via an Ethernet port, a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc. Through the network 1099, the device 110 may be distributed across a networked environment.

Multiple devices may be employed in a single device 110. In such a multi-device device, each of the devices may include different components for performing different aspects of the processes discussed above. The multiple devices may include overlapping components. The components listed in any of the figures herein are exemplary, and may be included a stand-alone device or may be included, in whole or in part, as a component of a larger device or system.

Figure 11:
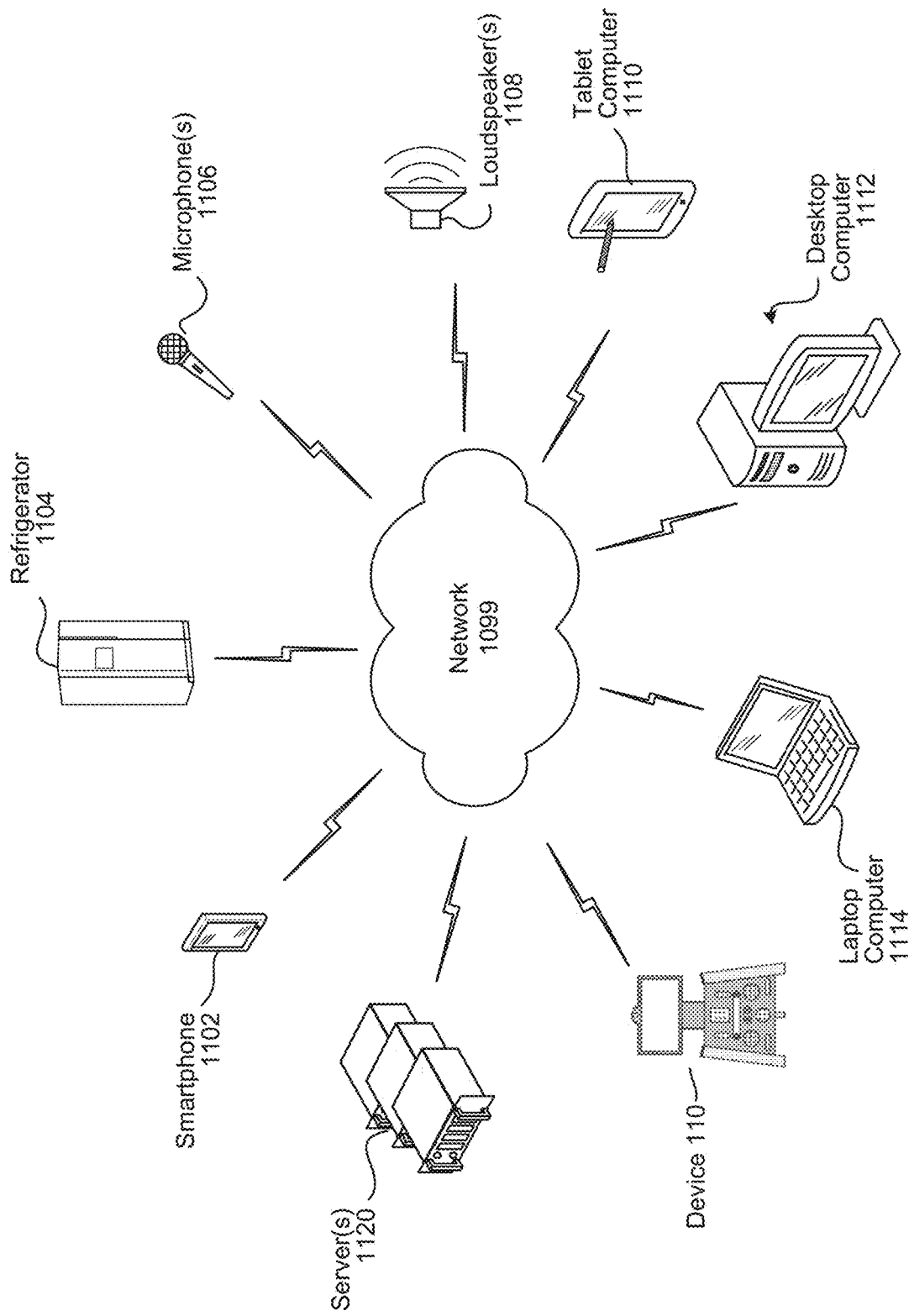
FIG. 11 illustrates a network including a system for acoustic echo cancellation according to embodiments of the present disclosure.

As illustrated in FIG. 11, the device 110 may be connected over a network(s) 1099. The network(s) 1099 may include a local or private network or may include a wide network such as the Internet. Devices may be connected to the network(s) 1099 through either wired or wireless connections. For example, the device 110, a smart phone 1102, a smart refrigerator 1104, a wireless microphone 1106, a wireless loudspeaker 1108, a tablet computer 1110, a desktop computer 1112, and/or a laptop computer 1114 may be connected to the network(s) 1099 through a wireless service provider, over a WiFi or cellular network connection, or the like. Other devices are included as network-connected support devices, such as a server 920. The support devices may connect to the network(s) 1099 through a wired connection or wireless connection.

The concepts disclosed herein may be applied within a number of different devices and computer systems, including, for example, general-purpose computing systems, multimedia set-top boxes, televisions, stereos, radios, server-client computing systems, telephone computing systems, laptop computers, cellular phones, personal digital assistants (PDAs), tablet computers, wearable computing devices (watches, glasses, etc.), other mobile devices, etc.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of digital signal processing and echo cancellation should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk and/or other media. Some or all of the device 110 may be implemented by a digital signal processor (DSP).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
   receiving, from a microphone of an autonomously motile device, input audio data;
   receiving speed data corresponding to a speed of the autonomously motile device;
   determining, based at least in part on the speed data, data corresponding to an acoustic echo cancellation component;
   processing the input audio data using the data to determine output audio data;
   determining that the output audio data includes a representation of an utterance; and
   sending, to a speech-processing component, data representing the utterance.

2. The computer-implemented method of claim 1, wherein:
   the data corresponds to an estimation of an acoustic channel between a microphone and a loudspeaker; and
   the loudspeaker is disposed on the autonomously motile device.

3. The computer-implemented method of claim 1, wherein the data comprises a step size of an adaptive filter, and the computer-implemented method further comprising:
   processing the speed and a maximum speed of the autonomously motile device to determine a normalized speed;
   processing the normalized speed with a sigmoid function to determine the step size; and
   determining, using the step size, filter coefficients of the adaptive filter.

4. The computer-implemented method of claim 1, wherein the data comprises a step size of an adaptive filter, and the computer-implemented method further comprising:
   processing the input audio data to determine a power level of the input audio data;
   processing the power level with a sigmoid function to determine the step size; and
   determining, using the step size, filter coefficients of the adaptive filter.

5. The computer-implemented method of claim 1, wherein the data comprises a number of iterations of an adaptive filter, and the computer-implemented method further comprising:
   determining, based at least in part on the input audio data and the speed, the number of iterations; and
   processing the input audio data with the adaptive filter in accordance with the number of iterations.

6. The computer-implemented method of claim 1, further comprising:
   prior to receiving the input audio data, receiving, from the microphone, second input audio data;
   determining first filter coefficients of an adaptive filter based at least in part on processing the second input audio data;
   determining second filter coefficients of the adaptive filter based at least in part on processing the second input audio data using the first filter coefficients; and
   after receiving the input audio data, determining third filter coefficients based at least in part on the first filter coefficients.

7. The computer-implemented method of claim 6, wherein determining the third filter coefficients comprises:
   determining a first quality metric for the first filter coefficients;
   determining a second quality metric for the second filter coefficients; and
   determining that the second quality metric represents a higher quality than the first quality metric.

8. The computer-implemented method of claim 1, further comprising:
processing, using a first component of an adaptive filter and a first step size, the input audio data to determine a first filter output;
processing, using a second component of the adaptive filter and a second step size greater than the first step size, the input audio data to determine a second filter output; and
processing the first filter output and the second filter output to determine output audio data.

9. The computer-implemented method of claim 1, further comprising:
processing the output audio data using a beamformer to determine directional audio data corresponding to a direction,
wherein determining that the output audio data includes the representation of the utterance comprises determining that the directional audio data includes the representation of the utterance; and
wherein sending the data representing the utterance comprises sending, to the speech-processing component, the directional audio data.

10. A system comprising:
at least one processor; and
at least one memory including instructions that, when executed by the at least one processor, cause the system to:
receive, from a microphone of an autonomously motile device, input audio data;
receive speed data corresponding to a speed of the autonomously motile device;
determine, based at least in part on the speed data, data corresponding to an acoustic echo cancellation component;
process the input audio data using the data;
determine output audio data using the input audio data and the data;
process the output audio data using a beamformer to determine directional audio data corresponding to a direction;
determine that the directional audio data includes a representation of an utterance; and
send, to a speech-processing component, the directional audio data.

11. The system of claim 10, wherein the data comprises a step size of an adaptive filter, and wherein the at least one memory further comprises instructions that, when executed by the at least one processor, further cause the system to:
process the speed and a maximum speed of the autonomously motile device to determine a normalized speed;
process the normalized speed with a sigmoid function to determine the step size; and
determine, using the step size, filter coefficients of the adaptive filter.

12. The system of claim 10, wherein the data comprises a step size of an adaptive filter, and wherein the at least one memory further comprises instructions that, when executed by the at least one processor, further cause the system to:
process the input audio data to determine a power level of the input audio data;
process the power level with a sigmoid function to determine the step size; and
determine, using the step size, filter coefficients of the adaptive filter.

13. The system of claim 10, wherein the data comprises a number of iterations of an adaptive filter, and wherein the at least one memory further comprises instructions that, when executed by the at least one processor, further cause the system to:
determine, based at least in part on the input audio data and the speed, the number of iterations; and
process the input audio data with the adaptive filter in accordance with the number of iterations.

14. The system of claim 10, wherein the at least one memory further comprises instructions that, when executed by the at least one processor, further cause the system to:
prior to receiving the input audio data, receive, from the microphone, second input audio data;
determine first filter coefficients of an adaptive filter based at least in part on processing the second input audio data;
determine second filter coefficients of the adaptive filter based at least in part on processing the second input audio data using the first filter coefficients; and
after receiving the input audio data, determine third filter coefficients based at least in part on the first filter coefficients.

15. The system of claim 14, wherein the at least one memory further comprises instructions that, when executed by the at least one processor, further cause the system to:
determine a first quality metric for the first filter coefficients;
determine a second quality metric for the second filter coefficients; and
determine that the second quality metric represents a higher quality than the first quality metric.

16. The system of claim 10, wherein the at least one memory further comprises instructions that, when executed by the at least one processor, further cause the system to:
process, using a first component of an adaptive filter and a first step size, the input audio data to determine a first filter output;
process, using a second component of the adaptive filter and a second step size greater than the first step size, the input audio data to determine a second filter output; and
process the first filter output and the second filter output to determine output audio data.

17. A computer-implemented method comprising:
receiving, from a microphone of an autonomously motile device, input audio data;
receiving speed data corresponding to a speed of the autonomously motile device;
determining, based at least in part on the speed data, a step size of an adaptive filter corresponding to an estimation of an acoustic channel between the microphone and a loudspeaker; and
processing the input audio data using the adaptive filter and the step size to determine output audio data.

18. A computer-implemented method comprising:
receiving, from a microphone of an autonomously motile device, input audio data;
receiving speed data corresponding to a speed of the autonomously motile device;
determining, based at least in part on the speed data a step size of an adaptive filter;
determining, using the step size, filter coefficients of the adaptive filter; and
processing the input audio data using the adaptive filter and the filter coefficients.

19. A computer-implemented method comprising:
receiving, from a microphone of an autonomously motile device, input audio data;

receiving speed data corresponding to a speed of the autonomously motile device;

determining, based at least in part on the speed data, data corresponding to an acoustic channel between the microphone and a loudspeaker;

processing the input audio data using the data to determine output audio data;

processing the output audio data to determine directional audio data corresponding to a direction;

determining that the directional audio data includes a representation of an utterance; and sending, to a speech-processing component, the directional audio data.

20. A computer-implemented method comprising:

receiving, from a microphone of a device, input audio data;

receiving movement data corresponding to movement of the device;

determining, based at least in part on the movement data, a number of iterations of an adaptive filter; and processing the input audio data with the adaptive filter in accordance with the number of iterations.

\* \* \* \* \*